(12) United States Patent
Venkatram et al.

(10) Patent No.: US 9,537,682 B2
(45) Date of Patent: Jan. 3, 2017

(54) HIGH SPEED RECEIVER WITH ONE-HOT DECISION FEEDBACK EQUALIZER

(71) Applicant: Intel Corporation, Santa Clara, CA (US)

(72) Inventors: Hariprasath Venkatram, Hillsboro, OR (US); Sami Hyvonen, Beaverton, OR (US); Tawfiq Musah, Portland, OR (US); Bryan K. Casper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 64 days.

(21) Appl. No.: 14/660,799

(22) Filed: Mar. 17, 2015

(65) Prior Publication Data
US 2016/0277219 A1 Sep. 22, 2016

(51) Int. Cl.
H04B 1/18 (2006.01)
H04L 25/03 (2006.01)
H04L 7/033 (2006.01)

(52) U.S. Cl.
CPC ......... *H04L 25/03057* (2013.01); *H04L 7/033* (2013.01)

(58) Field of Classification Search
USPC ................................ 375/233, 232, 130, 260
See application file for complete search history.

(56) References Cited

U.S. PATENT DOCUMENTS

| 5,892,632 | A | * | 4/1999 | Behrens | G11B 5/09 360/51 |
| 7,075,967 | B2 | * | 7/2006 | Struhsaker | H01Q 1/246 375/130 |
| 8,121,186 | B2 | * | 2/2012 | Chmelar | H03M 1/002 375/233 |
| 8,837,561 | B2 | | 9/2014 | Warke et al. | |
| 8,837,626 | B2 | | 9/2014 | Malipatil et al. | |
| 8,902,091 | B1 | | 12/2014 | Miller et al. | |
| 2009/0303096 | A1 | * | 12/2009 | Chmelar | H03M 1/002 341/160 |
| 2012/0327993 | A1 | * | 12/2012 | Palmer | H04L 7/041 375/232 |

OTHER PUBLICATIONS

International Search Report and Written Opinion for PCT Application No. PCT/US16/17405 mailed Jun. 2, 2016, 12 pages.

* cited by examiner

*Primary Examiner* — Eva Puente
(74) *Attorney, Agent, or Firm* — Green, Howard & Mughal, LLP

(57) ABSTRACT

Described is an apparatus which comprises: an amplifier; a first set of samplers to sample data output from the amplifier according to a clock signal, the set of samplers to generate an output; and a converter to convert the output of the first set of samplers to 1-hot encoded data.

18 Claims, 21 Drawing Sheets

| NLUR Vths | LUR tap loci | 1+D/2 tap loci | 1+D/2 Vths | Used Vths |
|---|---|---|---|---|
| H0/3 | +3H1/6 | +3H0/12 | 7H0/12 | 7H0/12 |
|  | +H1/6 | +H0/12 | 5H0/12 | 5H0/12 |
|  | -H1/6 | -H0/12 | 3H0/12 | 3H0/12 |
|  | -3H1/6 | -3H0/12 | H0/12 | H0/12 |
| 0 | +3H1/6 | +3H0/12 | 3H0/12 |  |
|  | +H1/6 | +H0/12 | H0/12 |  |
|  | -H1/6 | -H0/12 | -H0/12 |  |
|  | -3H1/6 | -3H0/12 | -3H0/12 |  |
| -H0/3 | +3H1/6 | +3H0/12 | -H0/12 | -H0/12 |
|  | +H1/6 | +H0/12 | -3H0/12 | -3H0/12 |
|  | -H1/6 | -H0/12 | -5H0/12 | -5H0/12 |
|  | -3H1/6 | -3H0/12 | -7H0/12 | -7H0/12 |

| NLUR Vths | LUR tap loci | 1+D/2 tap loci | H0 Vths | Used Vths |
|---|---|---|---|---|
| H0/2 | +3H1/6 | +3H0/12 | 9H0/12 | No Info |
|  | +H1/6 | +H0/12 | 7H0/12 | 7H0/12 |
|  | -H1/6 | -H0/12 | 5H0/12 | 5H0/12 |
|  | -3H1/6 | -3H0/12 | 3H0/12 | 3H0/12 |
| H0/6 | +3H1/6 | +3H0/12 | 5H0/12 |  |
|  | +H1/6 | +H0/12 | 3H0/12 |  |
|  | -H1/6 | -H0/12 | H0/12 |  |
|  | -3H1/6 | -3H0/12 | -H0/12 | -H0/12 |
| -H0/6 | +3H1/6 | +3H0/12 | H0/12 | H0/12 |
|  | +H1/6 | +H0/12 | -H0/12 |  |
|  | -H1/6 | -H0/12 | -3H0/12 |  |
|  | -3H1/6 | -3H0/12 | -5H0/12 |  |
| -H0/2 | +3H1/6 | +3H0/12 | -3H0/12 | -3H0/12 |
|  | +H1/6 | +H0/12 | -5H0/12 | -5H0/12 |
|  | -H1/6 | -H0/12 | -7H0/12 | -7H0/12 |
|  | -3H1/6 | -3H0/12 | -9H0/12 | No Info |

HIGH SPEED RECEIVER WITH ONE-HOT DECISION FEEDBACK EQUALIZER

BACKGROUND

Receiver complexity and its resultant circuit bandwidth limitation is one of the main impediments for realizing power and area-efficient high data rate input-output (IO) links. Traditional Decision Feedback Equalizers (DFEs) are not feasible for removing Inter-Symbol-Interference (ISI) at high data rates in receivers of IO links because traditional DFEs are limited by propagation delay of a closed loop having at least a summer (or adder), sampler(s), delay unit(s), and weight multiplier(s). For ultra-high data rates of 60 Giga bits per second (Gb/s) and more, one technique to improve the data rate and channel loss tolerance of IO transceivers is a DFE with tap speculation (or look-ahead). However, the exponential power and area cost of traditional DFE tap speculation makes it unattractive for links that target power and area efficiency.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2B illustrates a Table indicating an increase in the number of data thresholds from three to twelve and a reduction back to eight when the Clock Data Recovery (CDR) timing function constrains the first post-cursor of the PAM signal to half the cursor's magnitude (modified CDR timing function), according to some embodiments of the disclosure.

FIG. 2C illustrates a Table indicating an increase in the number of error thresholds from four to sixteen and a reduction back to eight when the modified CDR timing function, according to some embodiments of the disclosure.

DETAILED DESCRIPTION

Figure 1:
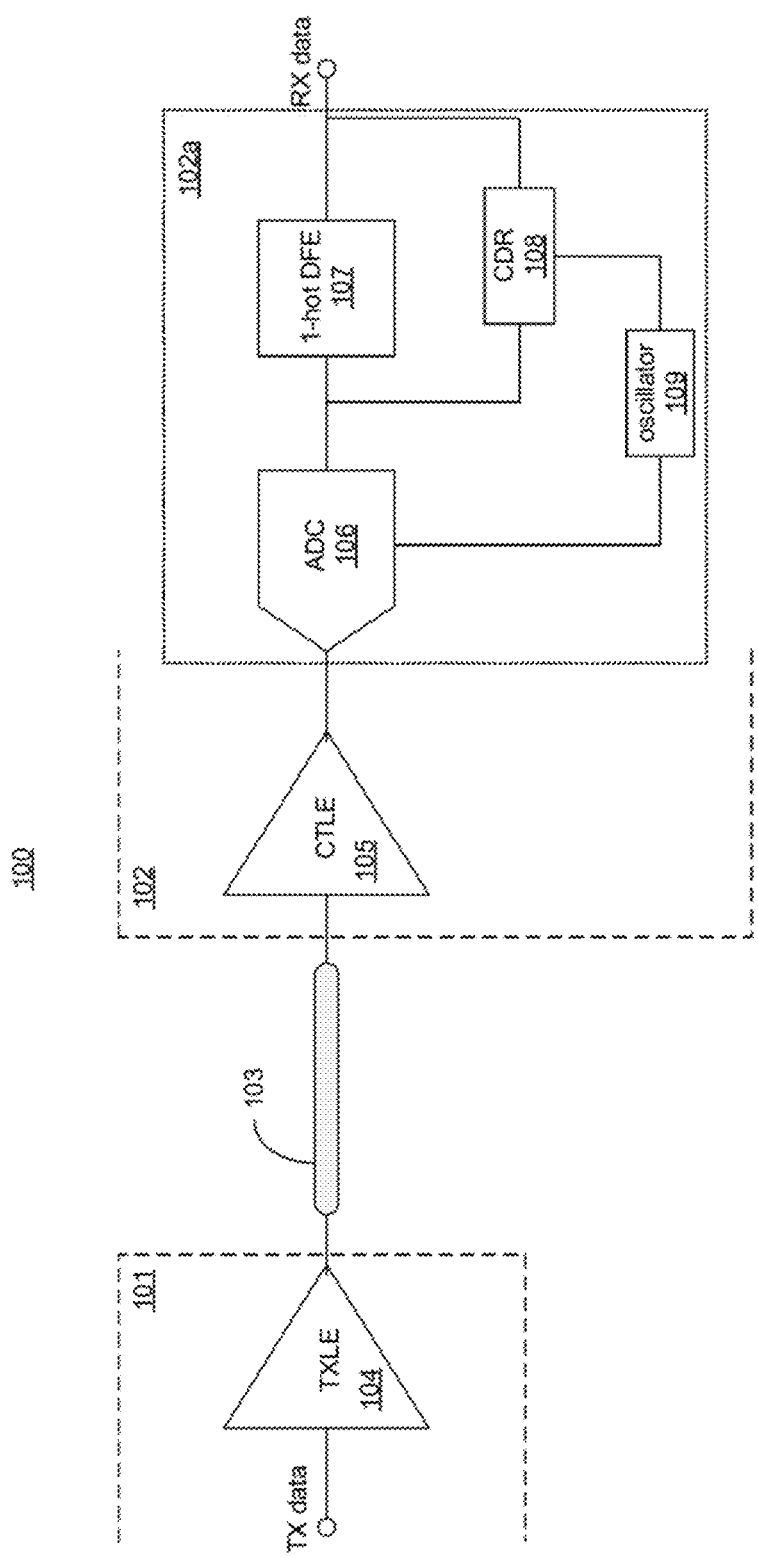
FIG. 1 illustrates a system with apparatus having a low power high-speed receiver with one-hot (1-hot) Decision Feedback Equalizer (DFE), according to some embodiments of the disclosure.

One way to increase the speed of Decision Feedback Equalizers (DFEs) is to use speculative DFEs. In speculative DFEs, the DFE is ready to remove Inter-Symbol-Interference (ISI) from the input data without knowing a priori whether a positive or negative weight needs to be added by the weight multipliers of the DFE. As such, for removing the first cursor ISI from the input data, at least two summers, two samplers, one multiplexer, and one delay unit are used.

In this example, one summer adds a positive weighting factor to the input data and another summer adds a negative weighting factor to the input data. The outputs of the summers are then sampled by the samplers (or compared by comparators). Continuing with the example of traditional speculative DFEs, the outputs of the samplers are received by a multiplexer. A control signal selects which path of the multiplexer to select (i.e., the one with the sampled output generated from the positive weight or the one with the sampled output generated from multiplying the negative weight). The output of the multiplexer is delayed by a delay unit and then fed back to the multiplexer.

A similar architecture is used for generating the error term for clock data recovery (CDR). However, traditional speculative DFEs use another set of samplers, summers, and logic for generating the error term for CDR. For example, for a 2 Pulse Amplitude Modulation (PAM) level scheme (also referred to as 2-PAM), speculative DFE use six samplers—two for data and four for error; for a 4-PAM level scheme, speculative DFE uses 28 samplers; for an 8-PAM level scheme, speculative DFE uses 120 samplers, and so on. Using the 4-PAM level scheme as a reference example, 28 samplers and associated logic for one IO (input-output) receiver link results in large area and power, especially when considering hundreds of links per processor.

Some embodiments described here use N-PAM signaling (where, 'N' is an integer) with modified Mueller-Muller (MMM) clock and data recovery that uses 1-tap one-hot (1-hot) Speculative DFE receiver architecture. In some embodiments, by using the CDR timing function to constrain the first post-cursor ISI of the PAM signals of any levels to half the cursor magnitude, the sampler thresholds of a speculative DFE overlap. This overlap leads to a significant reduction in the total number of samplers required in the DFE, according to some embodiments. In some embodiments, the DFE samplers are re-used for channel output quantization to enable multi-bit adaptation and timing recovery.

In some embodiments, 1-hot encoding scheme is used to implement speculative DFE to reduce the critical loop timing (e.g., by 50% compared to traditional speculative DFE loop timing). In traditional speculative DFEs, the critical timing loop exists between a feedback path from the delay unit to the multiplexer. As discussed above, in traditional speculative DFEs, the outputs of the samplers are received by the multiplexer and then a control signal selects which path of the multiplexer to select (i.e., the one with the sampled output generated from the positive weight or the one with the sampled output generated from multiplying the negative weight). The output of the multiplexer is delayed by the delay unit and then fed back to the multiplexer. Some embodiments reduce this critical loop timing by applying 1-hot encoding to the sampled input data. Various embodiments here are described with reference to 4-PAM signaling. However, the embodiments are applicable to other types of signaling too. For example, the embodiments can be extended to 2-PAM, 8-PAM, 16-PAM signaling.

Some embodiments provide a mechanism to convert the binary or grey coded sampled signals, which are output of the input samplers (e.g., Analog-to-Digital Converters (ADCs)) of 4-PAM signaling, into 1-hot signals. These 1-hot signals enable static and dynamic multiplexing techniques for implementing speculative DFE. In some embodiments, the 1-hot signaling scheme provides a 1-bit active output from among its four bits for a 2-bit binary representation. In some embodiments, dynamic circuits (e.g., domino logic style circuits) are used in the critical timing path of the speculative DFE which reduces the area and complexity of traditional speculative DFEs.

There are many technical effects of some embodiments. For example, a receiver with 4-PAM speculative DFE of some embodiments reduce the critical timing path to allow the receiver to operate at DFE speeds of up to 91 Gb/s. In some embodiments, the same comparators are used to resolve the transmitted data and to generate the error signals for the CDR and for the Automatic Gain Control (AGC). In some embodiments, multi-bit Least Mean Square (LMS) phase detection is used to improve the CDR loop gain/bandwidth beyond what is typical for baud-rate designs. In some embodiments, no DFE tap adaptation may be needed since the CDR tracks both the cursor and post-cursor DFE taps.

While various embodiments are described for enabling receivers to operate at high data rates (e.g., rates of 60 Gb/s and more), the embodiments are not limited to only high speed receivers. In some embodiments, the various mechanisms and implementations discussed are applicable to lower rate receivers (e.g., receivers operable to process data rates of 60 Gb/s, and less). Likewise, while various embodiments are described in conjunction of using a CDR timing function that constrains the first post-cursor ISI of the PAM signals of any levels to half the cursor's magnitude, some embodiments can be applied irrespective to using such a CDR timing function (i.e., 1-hot speculative DFE techniques described here can be used independent of the constrained CDR function described with reference to some embodiments).

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical or wireless connection between the things that are connected, without any intermediary devices. The term "coupled" means either a direct electrical, physical, or wireless connection between the things that are connected or an indirect direct electrical, physical, or wireless connection through one or more passive or active intermediary devices. The term "circuit" means one or more passive and/or active components that are arranged to cooperate with one another to provide a desired function. The term "signal" means at least one current signal, voltage signal, magnetic signal, electromagnetic signal, or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For purposes of the embodiments, the transistors in various circuits and logic blocks described here are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates system 100 with apparatus having a low power high-speed receiver with 1-hot DFE and/or reduced DFE samplers, according to some embodiments of the disclosure. In some embodiments, system 100 comprises processor 101, processor 102, and channel 103.

In some embodiments, processor 101 comprises Transmit Linear Equalizer (TXLE) 104 that receives transmit (TX) data as input and generates data for transmission over channel 103. In some embodiments, the receiver in processor 102 includes a Modified Mueller-Mueller (MMM) timing function h1=0.5*h0, where "h1" is the first post-cursor tap and where "h0" is the primary cursor tap. In some embodiments, TXLE 104 is used to pre-distort the transmitted signal in such a way that finding a sampling point where the condition h1=0.5*h0 is satisfied is easier.

While some embodiments are described with MMM timing function of h1=0.5*h0, a slight change to this timing function may still achieve the desired results in some embodiments. For example, in some embodiment, MMM timing function of h1=0.55*h0 may achieve the same result of cancelling ISI and reducing the number of comparators. In another example, MMM timing function of h1=0.45*h0 may achieve the same result of cancelling ISI and reducing the number of comparators. In some embodiments, the receiver uses 1-hot speculative DFE to reduce the critical loop timing of the DFE. As such, the DFE operating speed improves over traditional speculative DFEs.

In some embodiments, processor 102 comprises Mueller-Mueller circuit 102a and Continuous Time Linear Equalizer (CTLE) 105. In some embodiments, CTLE 105 comprises high-frequency and low-frequency equalizers. In some embodiments, the high-frequency equalizer uses a source-degenerated Current-Mode Logic (CML) stage. In some embodiments, the low-frequency equalizer includes a feedback loop that implements a low frequency pole and zero. In other embodiments, other types of CTLEs may be used for implementing CTLE 105. For example, in some embodiments CTLEs are passive CTLEs which are implemented with passive devices. In some embodiments, CTLE 105 provides more equalization and gain that aids the DFE. For example, when few DFE taps are used, CTLE 105 is useful for canceling long tail ISI. In some embodiments, CTLE 105 is coupled to a Variable Gain Amplifier (VGA).

In some embodiments, Mueller-Mueller circuit 102a comprises analog-to-digital (ADC) converter (e.g., comparator/samplers) 106 to quantize the input data into various levels according to the threshold voltages. In some embodiments, the threshold voltages are programmable (i.e., the threshold levels can be adjusted by software or hardware). In some embodiments, ADC 106 has a multipurpose use. For example, ADC 106 is implemented as DFE samplers for both data detection (using various threshold levels as discussed with reference to FIGS. 2-3) and channel output quantization to enable multi-bit adaptation and timing recovery. In some embodiments, the function of the VGA is implemented by adjusting the reference levels to ADC 106. By scaling the reference levels of ADC 106 up/down with respect to the input signal, the output of ADC 106 would appear to represent a lower/higher gain version of its input. In some embodiments, DFE samplers are clocked comparators. In other embodiments, other known samplers may be used as DFE samplers.

In some embodiments, Mueller-Mueller circuit 102a comprises 1-hot speculative DFE Logic 107 (as described with reference to FIGS. 7-12), CDR 108, and oscillator 109 coupled together as shown. In some embodiments, output receiver (RX) data of 1-hot speculative DFE Logic 107 is then processed by downstream logic (not shown). In some embodiments, oscillator 109 is a digitally controlled oscillator (DCO). In other embodiments, other types of oscillators may be used for oscillator 109. For example, Inductor-Capacitor (LC) oscillator, Voltage Controlled Oscillator (VCO), etc. may be used to implement oscillator 109. In some embodiments, oscillator 109 generates multiple phases (e.g., quadrature phases 0°, 90°, 180°, and 270°) for various sets of ADC 106. For example, for a 4-way interleaved receiver system, each set of samplers associated with a particular input slice (i.e., input channel) uses a clock signal of a particular quadrature phase to sample the input data from that slice. In some embodiments, oscillator 109 is used in lieu of an accumulator in the CDR loop filter (not shown here).

In some embodiments, CDR 108 has a CDR timing function (i.e., MMM timing function) which constrains the first post-cursor of a PAM signal to half the primary cursor's magnitude (i.e., h1=0.5*h0). In some embodiments, CDR 108 implements the above timing function by using a modified multi-bit Phase Detector (PD) that instructs oscillator 109 to change the output phase of its clock signal for ADC 106 until the first post-cursor of the PAM signal is substantially half the primary cursor's magnitude.

In some embodiments, when the above condition is satisfied, the majority of the ISI in the input data is cancelled while significantly reducing the number of samplers (thus reducing area and power) needed for data sampling and timing recovery. In some embodiments, the remaining ISI can be reduced or cancelled by using equalizers CTLE 105 at the receiver end (e.g., in processor 102) and/or TXLE 104 at the transmitter end (e.g., in processor 101).

Figure 2A:
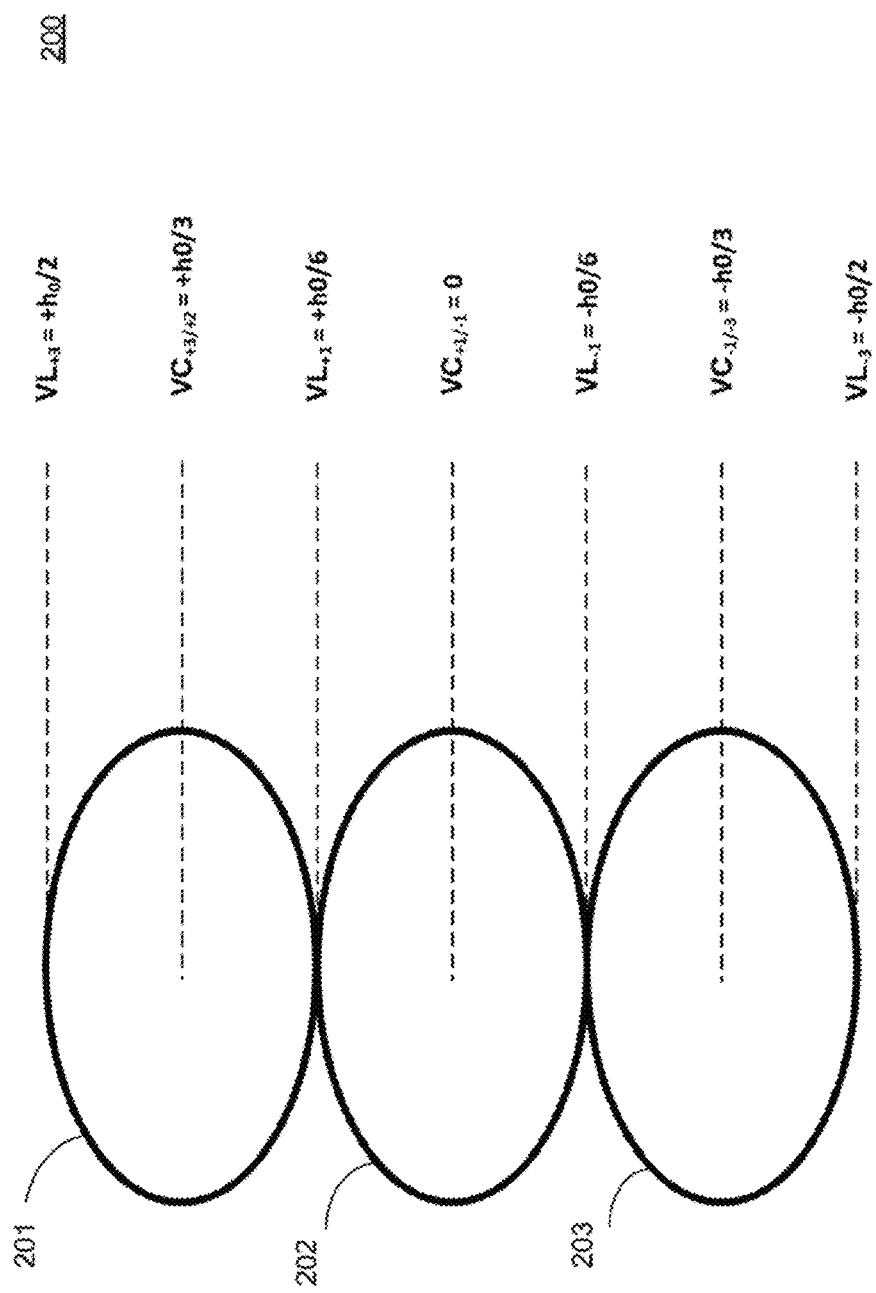
FIG. 2A illustrates three eyes sampled by three samplers to resolve 4-level Pulse Amplitude Modulation (PAM) data when no Inter-Symbol-Interference (ISI) is present.

FIG. 2A illustrates an eye diagram 200 showing the three eyes of a 4-level PAM (4-PAM) data with no ISI. It is pointed out that those elements of FIG. 2A having the same reference numbers (or names) as the elements of any other figure can operate or function in any manner similar to that described, but are not limited to such.

Here, eye diagram 200 has three eyes 201, 202, and 203 that represent the 4-PAM with no ISI, and would require seven samplers to resolve both the data and error for adaptation and clock recovery. To determine data from the three eyes, three center thresholds (i.e., $VC_{+1/-1}$=0; $VC_{+1/-3}$=−h0/3; and $VC_{+3/+2}$=+h0/3, where "VC" is the center threshold, "h0" is the primary cursor) are used. The other four level thresholds ($VL_{+3}$=+h0/2 for eye 201, $VL_{+1}$=+h0/6 for eye 201/202, $VL_{-1}$=+h0/6 for eye 201/203, and $VL_{-3}$=+h0/2 for eye 203) are used to extract the error. In the presence of first post-cursor ISI, the number of data samplers required increases from three to twelve while those required for error extraction increase from four to sixteen, bringing the total samplers needed to cancel the ISI in a speculative fashion, and to recover the clock, to twenty-eight.

In some embodiments, when the clock phase from oscillator 109 is aligned such that the first post-cursor h1 of PAM signal is constrained to half the primary cursor's magnitude (i.e., h1=0.5*h0), the first post-cursor ISI from the input data is cancelled speculatively using eight samplers, instead of twenty-eight.

FIG. 2B illustrates Table 220 indicating an increase in the number of the data thresholds (NLUR Vths) from three to twelve and the reduction back to eight (1+D/2 Vths) when the CDR timing function constrains the first post-cursor of PAM signal to half the cursor's magnitude, according to some embodiments of the disclosure. It is pointed out that those elements of FIG. 2B having the same reference numbers (or names) as the elements of any other figure can operate or function in any manner similar to that described, but are not limited to such.

The first column (labeled "NLUR Vths") of Table 220 from the left shows the original data thresholds of the PAM eyes when no ISI is present. ISI components added to each data threshold in the presence of a first post-cursor ISI of magnitude H1 (same as h1) is shown in the second column from the left (labeled "LUR tap loci"). The result of the ISI magnitude when the first post-cursor is constrained to half the magnitude of the primary cursor is shown in the third column from the left (labeled "1+D/2 tap loci"). A summation of contents of the first and third columns, which indicate the new speculative DFE sampler thresholds, is included in the fourth column (labeled "1+D/2 Vths"). The fifth column from the left list the corresponding unique elements of the fourth column.

FIG. 2C illustrates Table 230 which shows the reduction of the thresholds needed to extract the timing error needed for clock and data recovery, according to some embodiments of the disclosure. It is pointed out that those elements of FIG. 2C having the same reference numbers (or names) as the elements of any other figure can operate or function in any manner similar to that described, but are not limited to such.

The original thresholds with no ISI are included in the first column. These four thresholds grow to sixteen in the presence of a first post-cursor ISI, H1, with the ISI component listed in the second column. Once CDR 108 is used to constrain H1 to 0.5*H0, the ISI components are reduced to the values listed in the third column, according to some embodiments. Here, "H0" is the same as "h0" and "H1" is the same as "h1." The thresholds used to extract the timing are the summation of the content in the first and third columns, and are included in the fourth column.

Compared to FIG. 2B, FIG. 2C has ten unique thresholds. The highest and lowest thresholds are a result of the data not changing between two successive samples, and therefore essentially carry no phase information. As such, the middle eight thresholds are used, according to some embodiments. Thus, in some embodiments, the total number of comparators required compared to traditional number of comparators for 4-PAM are reduced from twenty-eight to just eight.

Figure 3:
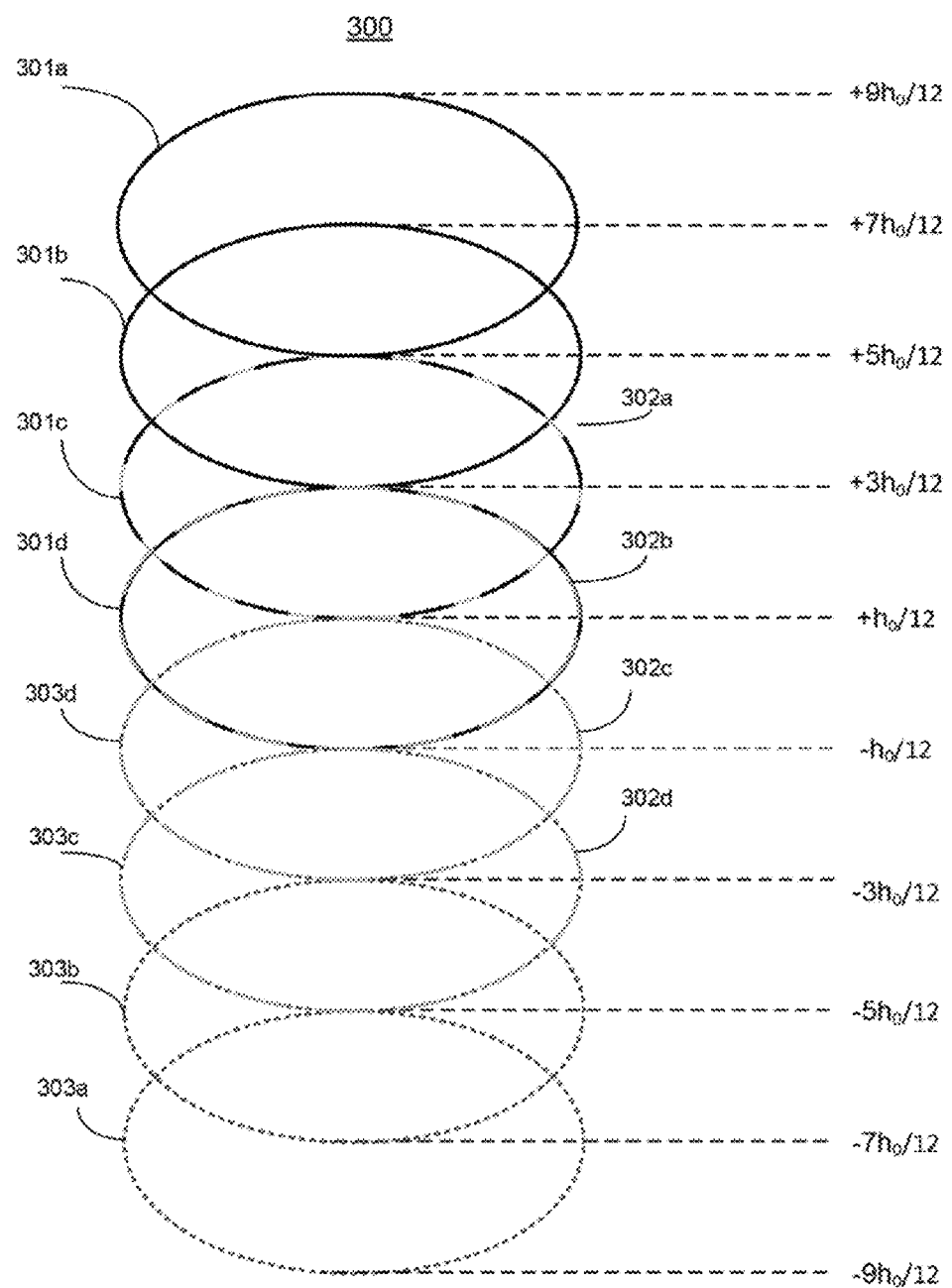
FIG. 3 illustrates overlapping eyes for generating error signal for clock recovery as well as data, according to some embodiments of the disclosure.

FIG. 3 illustrates an eye diagram 300 with overlapping eyes for generating error signal for clock recovery as well as data, according to some embodiments of the disclosure. It is pointed out that those elements of FIG. 3 having the same reference numbers (or names) as the elements of any other figure can operate or function in any manner similar to that described, but are not limited to such.

Here, eye diagram 300 has twelve overlapping eyes 301a-d, 302a-d, and 303a-d that are quantized by ADC 106 for phase error determination (i.e., for timing recovery) and 1-tap 1-hot speculative DFE realization. Eye diagram 300 is a graphical representation of the data and error thresholds derived in Tables 220 and 230. Visually, the convergence of the center of an eye with the level of other eyes, brought about by the use of CDR 108 to set h1=0.5*h0, could be observed according to some embodiments.

Figure 4:
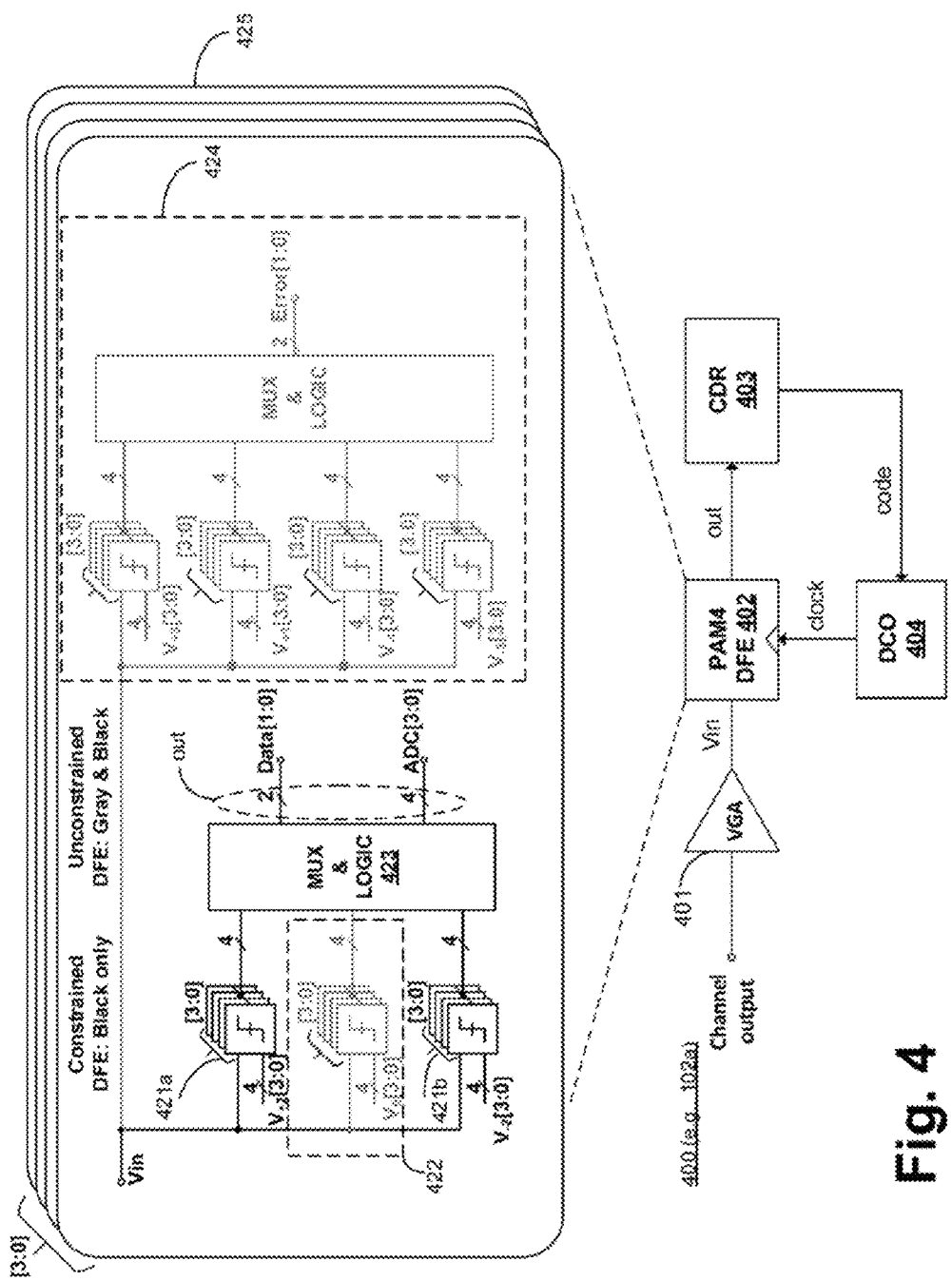
FIG. 4 illustrates an interleaved receiver slice showing reduced complexity when the modified CDR timing function, according to some embodiments.

FIG. 4 illustrates a four-way interleaved receiver 400 (e.g., part of 102a) with multiplexer and logic for implementing 1-hot speculative DFE and for showing reduced complexity when the CDR timing function constrains the first post-cursor of PAM signal to half the cursor's magnitude, according to some embodiments of the disclosure. It is pointed out that those elements of FIG. 4 having the same reference numbers (or names) as the elements of any other figure can operate or function in any manner similar to that described, but are not limited to such.

In some embodiments, receiver 400 comprises VGA 401, 4-PAM 1-hot Speculative DFE 402 (e.g., part of ADC 106), CDR 403 (e.g., 108), and DCO 404 (e.g., oscillator 109). In some embodiments, the output of channel 103 is received by VGA 401 that amplifies the input signal and generates input data Vin. The input data Vin has ISI. In some embodiments, DFE 402 comprises samplers or clocked comparators 421a and 421b. Here, the gray and black shaded components (e.g., data sampler 422, and phase error logic 424 having four sets of samplers, where each set has four samplers coupled to a multiplexer with its associated logic) are part of a traditional unconstrained DFE while the black only shaded components (e.g., samplers 421a and 421b, and multiplexer and associated logic 423) are part of the constrained DFE of various embodiments.

In some embodiments, constraining the ISI of the DFE results in multiple data levels merging with each other, thus using fewer numbers of samplers to resolve the input data Vin. In some embodiments, an ISI constraint that forces the first post-cursor to be half of the primary cursor results in a significant number of sampler reduction regardless of the PAM levels. For example, samplers 422 and those in logic 424 of traditional speculative or look-ahead DFEs are removed by the ISI constraint (h1=0.5*h0) implemented in accordance to various embodiments.

In some embodiments, the input data Vin (i.e., the output of VGA 401) is received by four slices 425 of the 1-hot speculative DFE, where each slice has eight samplers (i.e., 421a[3:0] and 421b[3:0]). The four slices of 425 are labeled as [3:0]. In some embodiments, each slice 425 receives a quadrature clock from DCO 404. For example, slice 425 [0] receives quadrature clock phase of 0° phase, slice 425[1] receives quadrature clock phase of 90° phase, slice 425 [2] receives quadrature clock phase of 180° phase, and slice 425[3] receives quadrature clock phase of 270° phase.

In some embodiments, each sampler of set 421a receives upper threshold voltage $V_{+2}[3:0]$. For example, sampler 421a[0] receives upper threshold $V_{+2}[0]$, sampler 421a[1] receives upper threshold $V_{+2}[1]$, sampler 421a[2] receives upper threshold $V_{+2}[2]$, and sampler 421a[3] receives upper threshold $V_{+2}[3]$. In some embodiments, the output of set of samplers 421a is received by multiplexer and associated logic (MUX & LOGIC) 423 for resolving input data Vin of various eyes.

In some embodiments, each sampler of set 421b receives lower threshold voltage $V_{-2}[3:0]$. For example, sampler 421b[0] receives lower threshold $V_{-2}[0]$, sampler 421b[1] receives lower threshold $V_{-2}[1]$, sampler 421b[2] receives lower threshold $V_{-2}[2]$, and sampler 421b[3] receives lower threshold $V_{-2}[3]$.

In some embodiments, the output of the set of samplers 421b is received by MUX & LOGIC 423, which together with the output of samplers 421a provides output as a flash ADC. In some embodiments, MUX & LOGIC 423 includes a 1-hot encoding scheme that reduces the critical loop timing compared to traditional speculative DFEs. In some embodiments, the output "out" of MUX & LOGIC 423 includes two bits of Data[1:0] and four binary bits of ADC[3:0], where ADC[3:0] bits are used for determining the phase error. In some embodiments, ADC[3:0] bits are generated from eight bits of thermometer code. Here, the thermometer code is four bits of output from the sampler set 421a when combined with four bits of the output from the sampler set 421b. Portions of various embodiments of MUX & LOGIC 423 are described with reference to FIGS. 7-12.

Referring back to FIG. 4, samplers 422 are removed because thresholds to samplers 421a and 421b cover all combinations for detecting data of various eyes of Vin, according to some embodiments. Removing samplers 422 saves power and area. In such embodiments, center thresholds $V_0[3:0]$ are not needed. In some embodiments, sampler sets 421a and 421b together receive uniformly distributed thresholds $V_{+2}[3:0]$ and $V_{-2}[3:0]$ that effectively realize a flash ADC. As such, the samplers of logic 424 are not needed because the outputs of samplers 421a and 421b can be used for error calculation. Removing the samplers and logic of 424 saves power and area for the receiver.

Figure 5:
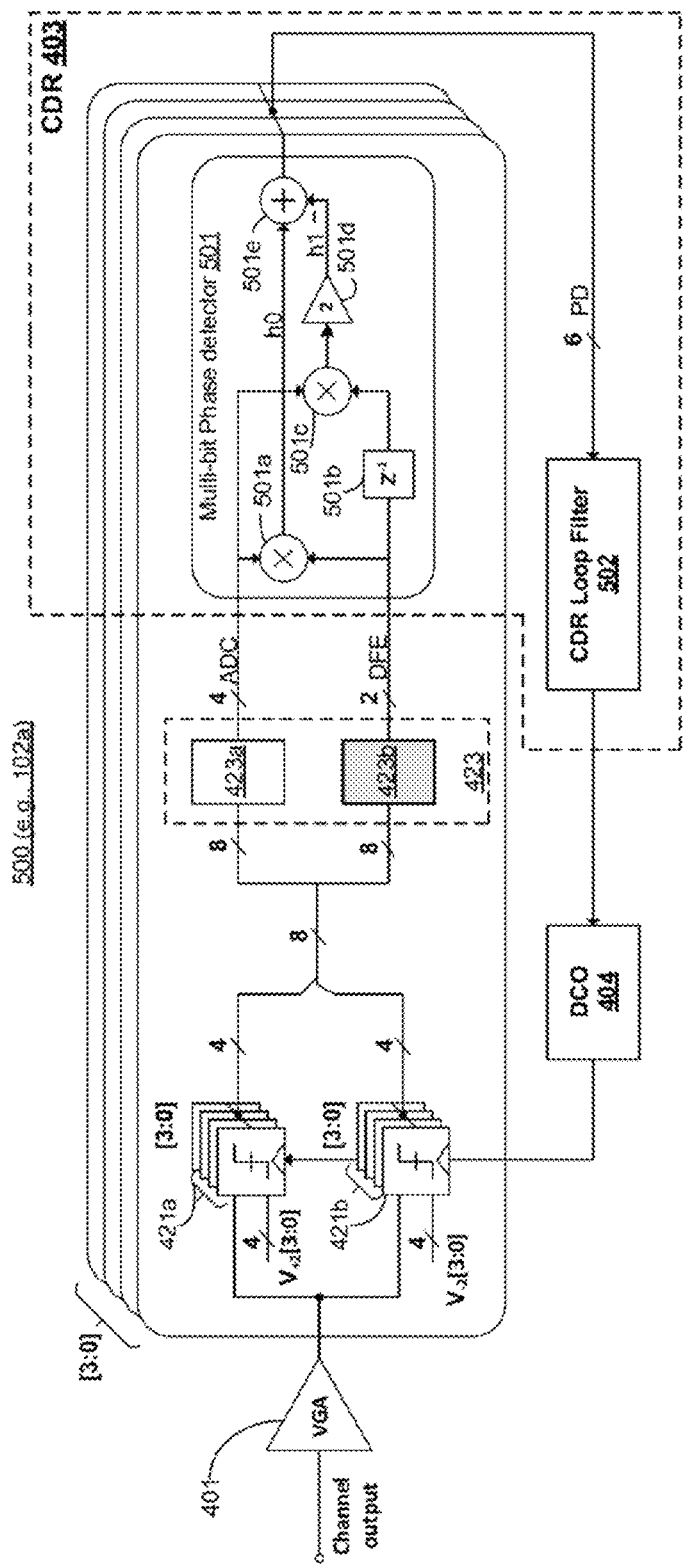
FIG. 5 illustrates an interleaved receiver slice with 1-hot speculative DFE tap and with modified CDR timing function, according to some embodiments.

FIG. 5 illustrates an interleaved receiver slice 500 (e.g., 102a) with 1-hot speculative DFE tap and with a CDR timing function that constrains the first post-cursor of PAM signal to half the cursor's magnitude, according to some embodiments of the disclosure. It is pointed out that those elements of FIG. 5 having the same reference numbers (or names) as the elements of any other figure can operate or function in any manner similar to that described, but are not limited to such. So as not to obscure the various embodiments, components described before are not discussed in detail again.

In some embodiments, the outputs of sets of samplers 421a and 421b are merged to form an 8-bit bus which is received by MUX & LOGIC 423. In some embodiments, MUX & LOGIC 423 comprises thermometer-to-digital converter 423a to convert the 8-bit thermometer code (i.e., the output of the flash ADC formed by the combination of the sets of samplers 421a and 421b) to a 4-bit binary output ADC. In some embodiments, the 4-bit output ADC is received by a multi-bit PD 501.

In some embodiments, MUX & LOGIC 423 comprises logic 423b that performs 1-hot speculative DFE on the eight bits received from samplers 421a and 421b. In some embodiments, the output of 1-hot speculative DFE 423b is a 2-bit output DFE. Various embodiments of 423b are described with reference to FIGS. 7-12.

Referring back to FIG. 5, in some embodiments, CDR 403 comprises a multi-bit PD 501 and CDR Loop Filter 502. In some embodiments, PD 501 comprises correlation or expectation units 501a and 501c, delay unit ($Z^{-1}$) 501b, multiplying buffer 501d, and summer 501e. In some embodiments, ADC output is received by correlation or expectation units 501a and 501c. Any suitable correlation or expectation unit may be used to implement correlation or expectation units 501a and 501c.

In some embodiments, the DFE output is received by correlation or expectation unit 501a and delay unit ($Z^{-1}$) 501b. In some embodiments, the output of correlation or expectation unit 501a is h0 which is received by summer 501e. In some embodiments, the output of correlation or expectation unit 501c is received by digital multiplier 501d (that multiplies the input by two). In some embodiments, the output of 501e signal PD indicates whether DCO 404 should move the phase of the clock forward or backwards from its previous position.

In some embodiments, the multi-bit PD signal also indicates the amount by which the phase of the clock should move forward or backwards from its previous position. In some embodiments, the output of signal PD (here shown as a 6-bit signal) is filtered by CDR Loop Filter 502. CDR Loop Filter 502 can be implemented with any suitable loop filter designs. The output of CDR Loop Filter 502 is then received by DCO 404 which generates the quadrature clock for the set of samplers 421a and 421b. In some embodiments, PD 501 continues to cause DCO 404 to adjust its output clock phase until the CDR timing condition h1=0.5*h0 is met. In some embodiments, when this condition is met, DCO 404 stops adjusting the clock phases. When the CDR timing condition h1=0.5*h0 is met, the majority of the ISI is cancelled from the signal DFE (output of 423b).

Figure 6:
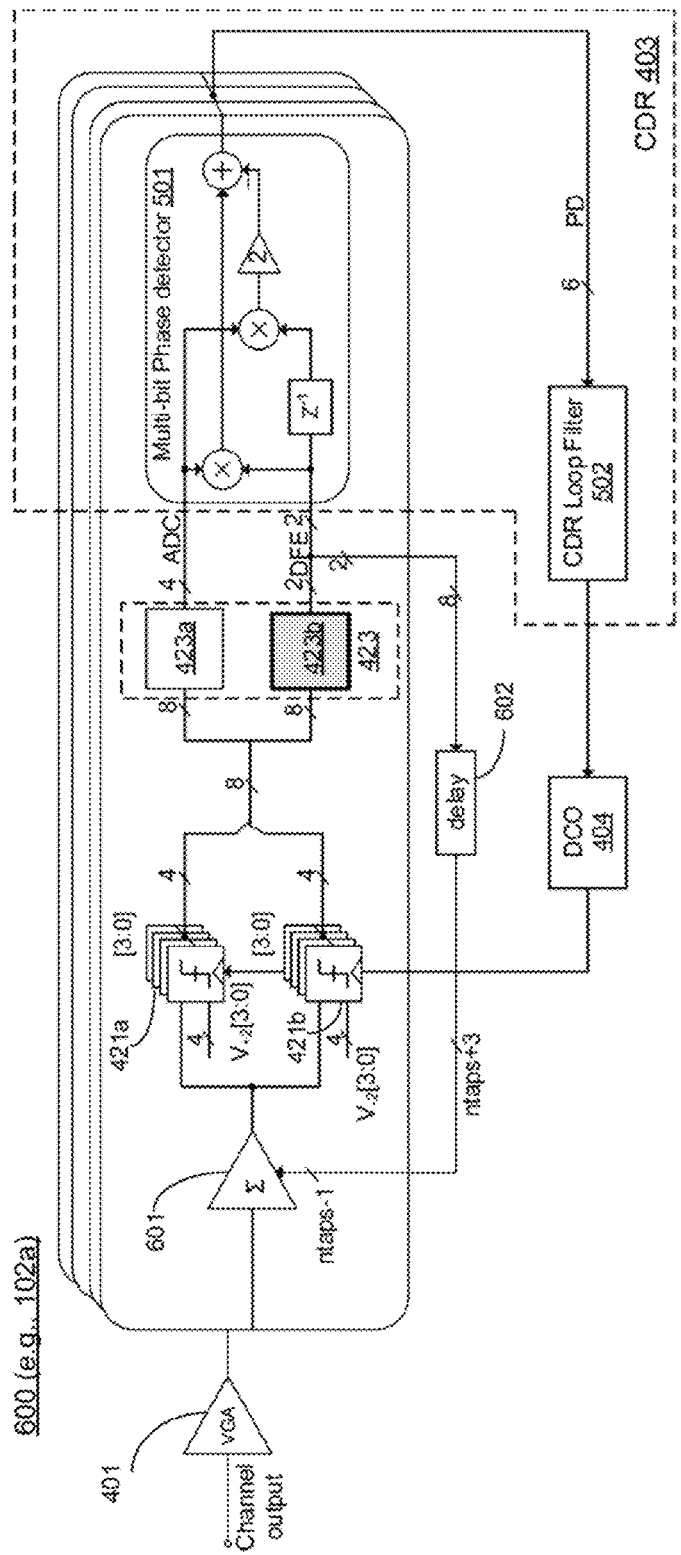
FIG. 6 illustrates an interleaved receiver slice with 'n' number of taps, only the first tap being speculative using 1-hot speculative DFE, and with modified CDR timing function, according to some embodiments of the disclosure.

FIG. 6 illustrates an interleaved receiver slice 600 with 'n' number of taps, the first tap being speculative using 1-hot speculative DFE, and with CDR timing function that constrains the first post-cursor of PAM signal to half the cursor's magnitude, according to some embodiments of the disclosure. It is pointed out that those elements of FIG. 6 having the same reference numbers (or names) as the elements of any other figure can operate or function in any manner similar to that described, but are not limited to such. So as not to obscure the various embodiments, components described before are not discussed in detail again.

FIG. 6 is substantially similar to FIG. 5 except that 'n' number of taps are implemented, where 'n' is an integer greater than 1. In some embodiments, DFE signals (i.e., two bits from each slice resulting in a total of eight bits) from MUX & LOGIC 423 of each of the four slices (for the 4-PAM architecture) are delayed by delay unit 602 and then summed at summer 601. In some embodiments, each receiver slice has a summer 601 which receives the output of delay 602 (i.e., ntaps-1). In some embodiments, each receiver slice summer receives an ntaps-1 signal from the output of delay 602, with the feedback signals offset by one sample per receiver slice. For instance, slice[0] receives feedback signals 2:ntap, slice[1] receives 3:ntap+1, slice[2] receives 4:ntap+2, and slice[3] receives 5:ntap+3. In some embodiments, the output of VGA 401 drives the inputs of summers 601 in each receiver slice.

Figure 7:
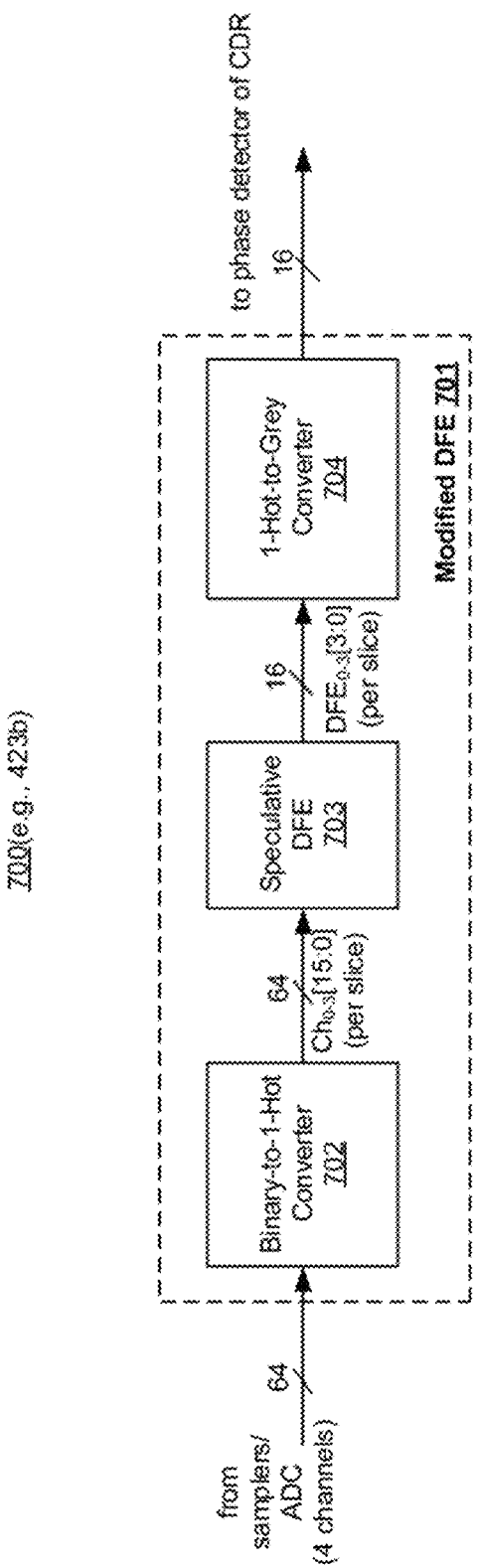
FIG. 7 illustrates a modified DFE circuit implementing 1-hot speculative DFE, according to some embodiments of the disclosure.

FIG. 7 illustrates Modified DFE circuit 700 (e.g., 423b) implementing a 1-hot speculative DFE, according to some embodiments of the disclosure. It is pointed out that those elements of FIG. 7 having the same reference numbers (or names) as the elements of any other figure can operate or function in any manner similar to that described, but are not limited to such. So as not to obscure the various embodiments, components described before are not discussed in detail again.

In some embodiments, Modified DFE 701 comprises Binary-to-1-Hot Converter 702 and Speculative DFE 703. In some embodiments, Modified DFE 701 comprises 1-Hot-to-Grey Converter 704. In some embodiments, Modified DFE 701 comprises 1-Hot-to-Binary Converter instead of 1-Hot-to-Binary Converter 704. With reference to 4-PAM signaling, in some embodiments, the binary output of samplers 421a/b from the four channels are converted to 1-hot signaling by Converter 702. Table 1 below provides an example of 1-hot encoding performed by Converter 702.

TABLE 1

| Binary to 1-hot Conversion | | | | |
|---|---|---|---|---|
| Binary | 1-hot encoded data | | | |
| 00 | 1 | 0 | 0 | 0 |
| 01 | 0 | 1 | 0 | 0 |
| 10 | 0 | 0 | 1 | 0 |
| 11 | 0 | 0 | 0 | 1 |

Here, 2-bit binary input is converted to 4-bit 1-hot encoded data. For each binary input, one bit of the 4-bit encoded data is active. As illustrated by Table 1, in some embodiments, 1-hot signaling allows for a single transmission gate multiplexer (mux) to propagate 2-bit binary signals instead of the conventional two transmission gate multiplexer delays.

For example, in some embodiments, four independent transmission gate multiplexer outputs can be tied together without contention. As such, critical loop delay reduces which enables a high speed static combinational logic circuit for the critical path of the 1-tap loop unrolled speculative DFE. In some embodiments, since one of the four bits are active at any time (in 1-hot signaling), dynamic logic circuits can be used for the critical timing path to reduce area and complexity over traditional DFEs. In some embodiments, the dynamic logic circuits further speed up the DFE operation, for example by 30%, over the already improved 50% timing delay using static circuits.

In some embodiments, Speculative DFE 703 comprises a 4-way interleaved 1-hot unrolled speculative DFE implemented with samplers, multiplexers, and delay units (e.g., implemented as sequential units such as flip-flops). In some embodiments, 64-bit data (i.e., $Ch_{0-3}[15:0]$ per slice) is received by Speculative DFE 703 from Converter 702. In some embodiments, Speculative DFE 703 cancels ISI in the input data using static or dynamic circuits as described with reference to FIGS. 9-12.

Referring back to FIG. 7, in some embodiments, the output of Speculative DFE 703 is a 64-bit bus for the four slices (i.e., $DFE_{0-4}[3:0]$). In some embodiments, the output of Speculative DFE 703 is converted from 1-hot signaling to binary data. In some embodiments, the output of Speculative DFE 703 is converted from 1-hot signaling to Grey encoded data by Converter 704. This binary data is then provided to phase detector 501 of CDR 403, according to some embodiments.

Figure 8:
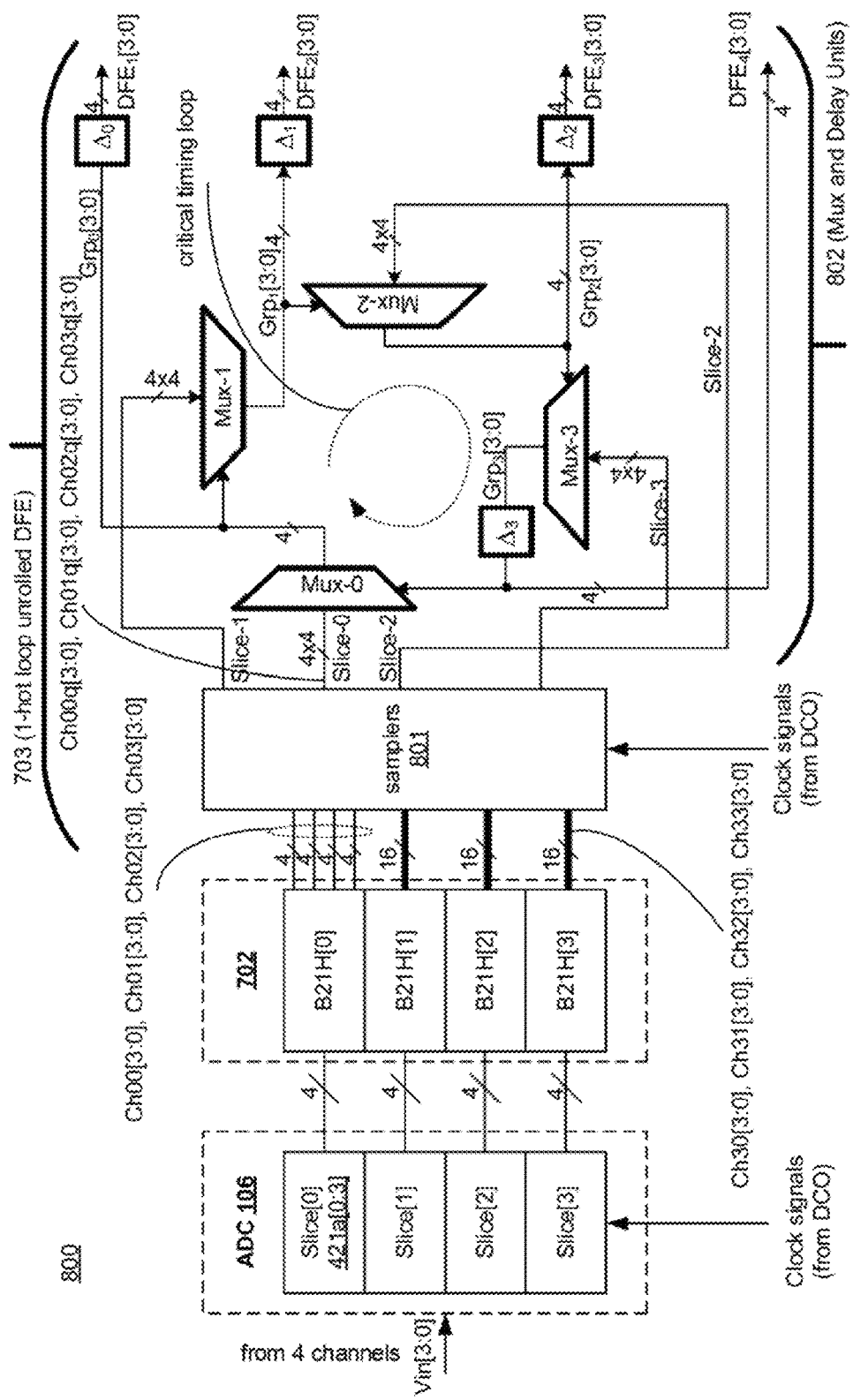
FIG. 8 illustrates a 4-PAM modified DFE circuit implementing 1-hot loop unrolled speculative DFE, according to some embodiments of the disclosure.

FIG. 8 illustrates a 4-PAM modified DFE circuit 800 implementing a 1-hot loop unrolled speculative DFE, according to some embodiments of the disclosure. It is pointed out that those elements of FIG. 8 having the same reference numbers (or names) as the elements of any other figure can operate or function in any manner similar to that described, but are not limited to such. So as not to obscure the various embodiments, components described before are not discussed in detail again.

In some embodiments, Speculative DFE circuit 800 (e.g., 703) includes samplers 801, and multiplexers and Delay Units 802. In some embodiments, ADC 106 receives input data Vin[3:0] from the four slices (hence, the label [3:0]) from four separate channels. In some embodiments, these channels are adjacent to one another. In some embodiments, ADC 106 includes four sets of samplers labeled as Slice[0] through Slice[3] such that each slice comprises samplers 421a[0:3] (i.e., four sets of samplers per slice as described with reference to FIGS. 4-6). Referring back to FIG. 8, in some embodiments, samplers in each slice of ADC 106 sample/compare data using one of the quadrature clock signals.

For example, samplers 421a[0:3] of Slice[0] sample Vin [0] data using clock edge of 0° clock phase from oscillator 109; samplers 421a[0:3] of Slice[1] sample Vin[1] data using clock edge of 90° clock phase from oscillator 109; samplers 421a[0:3] of Slice[2] sample Vin[2] data using clock edge of 180° clock phase from oscillator 109; and samplers 421a[0:3] of Slice[3] sample Vin[3] data using clock edge of 270° clock phase from oscillator 109.

In some embodiments, the output of ADC 106 is converted to 1-hot signaling by Converter 702. In some embodiments, the outputs of each set of samplers in ADC 106 is received by a corresponding binary to 1-hot converter (B21H) labeled as B21H[0] through B21H[3]. In some embodiments, each B21H converter receives a 4-bit binary input data and converts it to 4-bit 1-hot encoded data. As such, each B21H converter in Converter 702 provides four sets of four data bits. For example, the outputs of B21H[0] are Ch00[3:0], Ch01[3:0], Ch02[3:0], and Ch02[3:0], while the outputs of B21H[3] are Ch30[3:0], Ch31[3:0], Ch32[3:0], and Ch32[3:0].

In some embodiments, the output of Converter 702 is sampled by samplers 801. In some embodiments, samplers 801 are implemented as flip-flops that sample data at rising/falling edges of the clock signals provided by oscillator 109. In some embodiments, all samplers of samplers 801 use the same clock edge of the same quadrature clock to sample the 1-hot input. In some embodiments, Mux and Delay Units 802 include four sets of multiplexers—Mux-0, Mux-1, Mux-2, and Mux-3—and at least four sets of delay units—$\Delta_1$ through $\Delta_3$. In some embodiments, the delay units are implemented as flip-flops that sample their inputs at every rising or falling edge of a clock signal. In some embodiments, the same clock signal used by samplers 801 is used by the delay units.

In some embodiments, the multiplexers are coupled together in a ring format such that the output of one set of multiplexers is used as select signals for the next set of multiplexers and so on, while the first set of multiplexers in the ring is controlled by a delayed version of the output of the previous set of multiplexers in the ring. As such, a previous multiplexer output is used for selecting output of the current multiplexer at a given time.

For example, sampled data of Slice-0 is received by the first set of multiplexers Mux-0 (e.g., four multiplexers) which output data $Grp_0[3:0]$ as select signals to the second set of multiplexers Mux-1 (e.g., four multiplexers). In some embodiments, sampled data of Slice-1 is received by the second set of multiplexers Mux-1 (e.g., four multiplexers) which output data $Grp_1[3:0]$ as select signals to the third set of multiplexers Mux-2 (e.g., four multiplexers). In some embodiments, sampled data of Slice-1 is received by the second set of multiplexers Mux-1(e.g., four multiplexers) which output data $Grp_1[3:0]$ as select signals to the third set of multiplexers Mux-2 (e.g., four multiplexers). In some embodiments, the sampled data of Slice-2 is received by the third set of multiplexers Mux-2 (e.g., four multiplexers) which output data $Grp_2[3:0]$ as select signals to the fourth set of multiplexers Mux-3 (e.g., four multiplexers). In some embodiments, the select signals of the first set of multiplexers Mux-0 is the delayed output $Grp_3[3:0]$ of the fourth set of multiplexers Mux-3.

In some embodiments, the output $Grp_0[3:0]$ of the first set of multiplexers Mux-0 is delayed by the first delay unit $\Delta_0$ to generate the first set of DFE data $DFE_1[3:0]$. In some embodiments, the output $Grp_1[3:0]$ of the second set of multiplexers Mux-1 is delayed by the second delay unit $\Delta_1$ to generate the second set of DFE data $DFE_2[3:0]$. In some embodiments, the output $Grp_2[3:0]$ of third set of multiplexers Mux-2 is delayed by the third delay unit $\Delta_2$ to generate the third set of DFE data $DFE_3[3:0]$. In some embodiments, the output $Grp_3[3:0]$ of fourth set of multiplexers Mux-3 is delayed by the fourth delay unit $\Delta_3$ to generate the fourth set of DFE data $DFE_3[3:0]$.

Here, the critical timing path is reduced to the path shown by the dotted line. This path is shorter than traditional critical timing paths of traditional DFEs. As such, the 1-hot signaling scheme enables a static and dynamic multiplexer implementation to reduce critical loop timing (e.g., by 50% over traditional DFE) of the 1-tap loop unrolled DFE.

Figure 9:
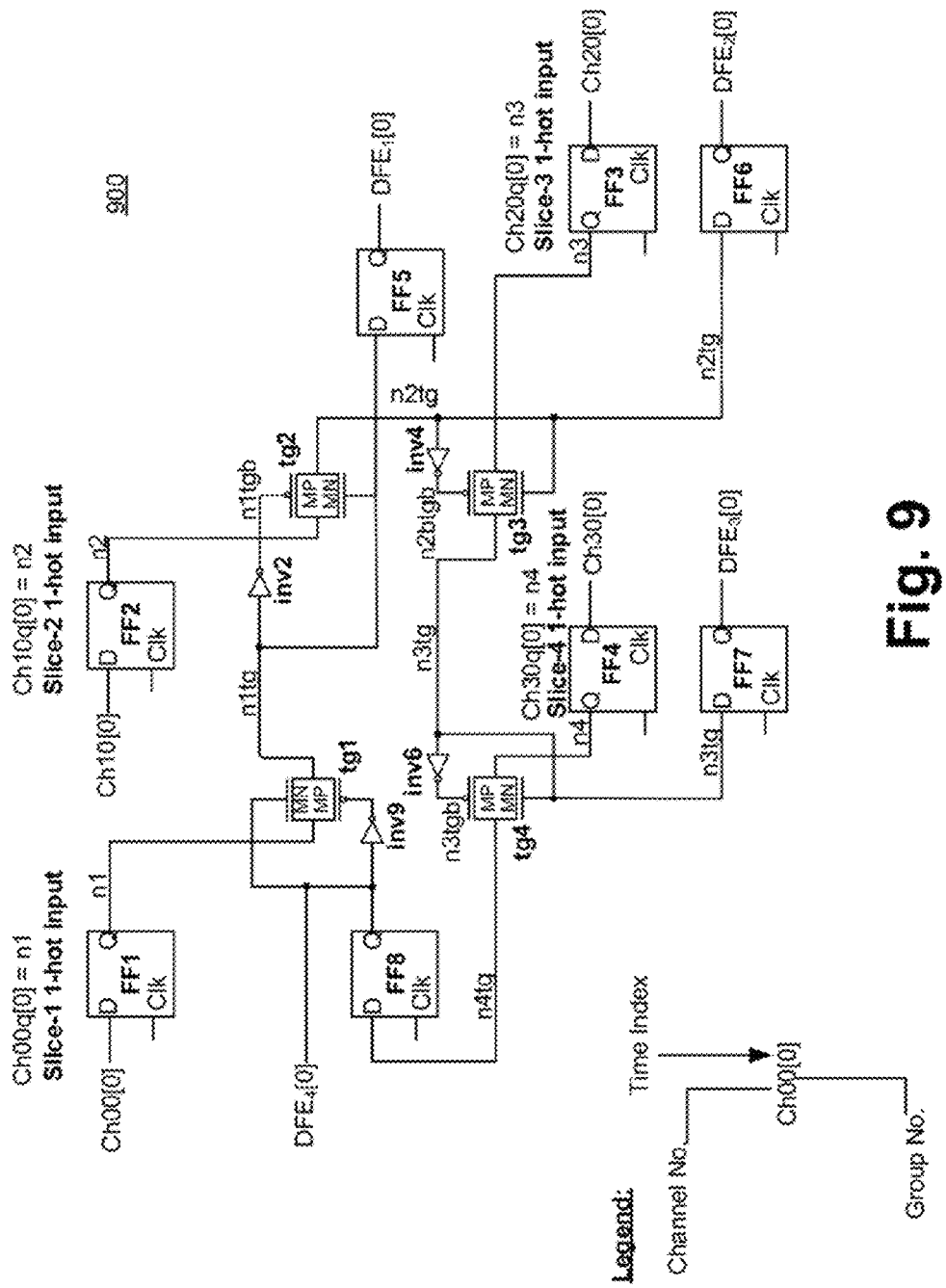
FIG. 9 illustrates one slice of a static 1-hot quadrature rate DFE, according to some embodiments of the disclosure.

FIG. 9 illustrates one slice 900 of a static 1-hot quadrature rate DFE, according to some embodiments of the disclosure. It is pointed out that those elements of FIG. 9 having the same reference numbers (or names) as the elements of any other figure can operate or function in any manner similar to that described, but are not limited to such.

Slice 900 describes a portion of samplers 801 (implemented as flip-flops), multiplexers—Mux-0, Mux-1, Mux-2, and Mux-3 (implemented as pass-gates)—and delay units $\Delta_{0-3}$ (implemented as flip-flops). In some embodiments, slice 900 includes samplers FF1, FF2, FF4, and FF3 that receive a first bit from each channel (i.e., Ch00[0], Ch10[0], Ch20 [0], and Ch30[0], respectively). In some embodiments, slice 900 includes four pass-gates tg1, tg2, tg3, and tg4 representing one-sixteenth of a slice of multiplexers Mux-0, Mux-1, Mux-2, and Mux-3, respectively. In some embodiments, the outputs of each sampler is coupled to a pass-gate.

For example, output n1 of sampler FF1 is coupled to pass-gate tg1, output n2 of sampler FF2 is coupled to pass-gate tg2, output n3 of sampler FF3 is coupled to pass-gate tg3, and output n4 of sampler FF4 is coupled to pass-gate tg4. Here, labels for nodes and signals are interchangeably used. For example, the term n2 may refer to node n2 or signal n2 depending on the context of the sentence. In some embodiments, the four pass-gates are coupled together in a ring fashion such that output of one pass-gate is used as a control signal for the subsequent pass-gate in the ring. For example, outputs n1tg and n1 tgb are used to control pass-gate tg2; outputs n2btg and n2btgb are used to control pass-gate tg3; outputs n3tgb and n3tgb are used to control pass-gate tg4; and outputs $DFE_4[0]$ and $DFEb_4[0]$ are used to control pass-gate tg1. To provide correct signal polarities to the gate terminals of the pass-gates, inverters inv2, inv4, inv6, and inv9 are used as shown.

In some embodiments, delay units of 802 are implemented as flip-flops FF5, FF6, FF7, and FF8. In some embodiments, output of each pass-gate is sampled by a flip-flop to generate the DFE data sample. For example, FF5 samples output n1tg of pass-gate tg1 to generate $DFE_1[0]$. In some embodiments, FF6 samples output n2btg of pass-gate tg2 to generate $DFE_2[0]$. In some embodiments, FF7 samples output n3tg of pass-gate tg3 to generate $DFE_3[0]$. In some embodiments, FF8 samples output n4tg of pass-gate tg4 to generate $DFE_4[0]$. Here, the critical timing path is established by the electrical path from FF8, inv9, tg1, inv2, tg2, inv4, tg3, inv6, tg4 and back to the input of FF8. This critical path is much shorter than the traditional DFE critical timing paths because the traditional DFE critical timing path includes twice as many multiplexers as those shown with reference to FIG. 9.

Figure 10:
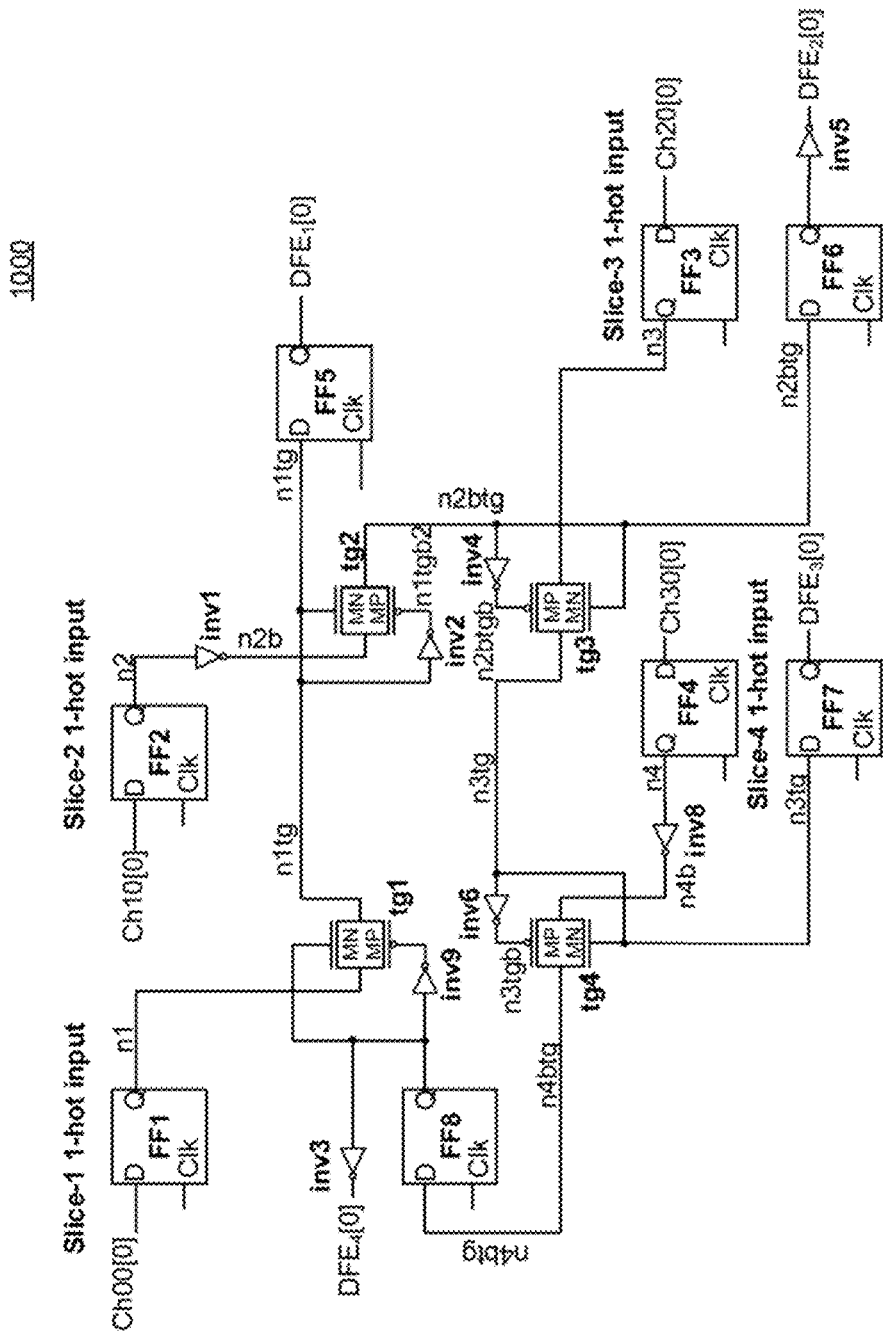
FIG. 10 illustrates one slice of a static 1-hot quadrature rate DFE, according to some embodiments of the disclosure.
Figure 11A:
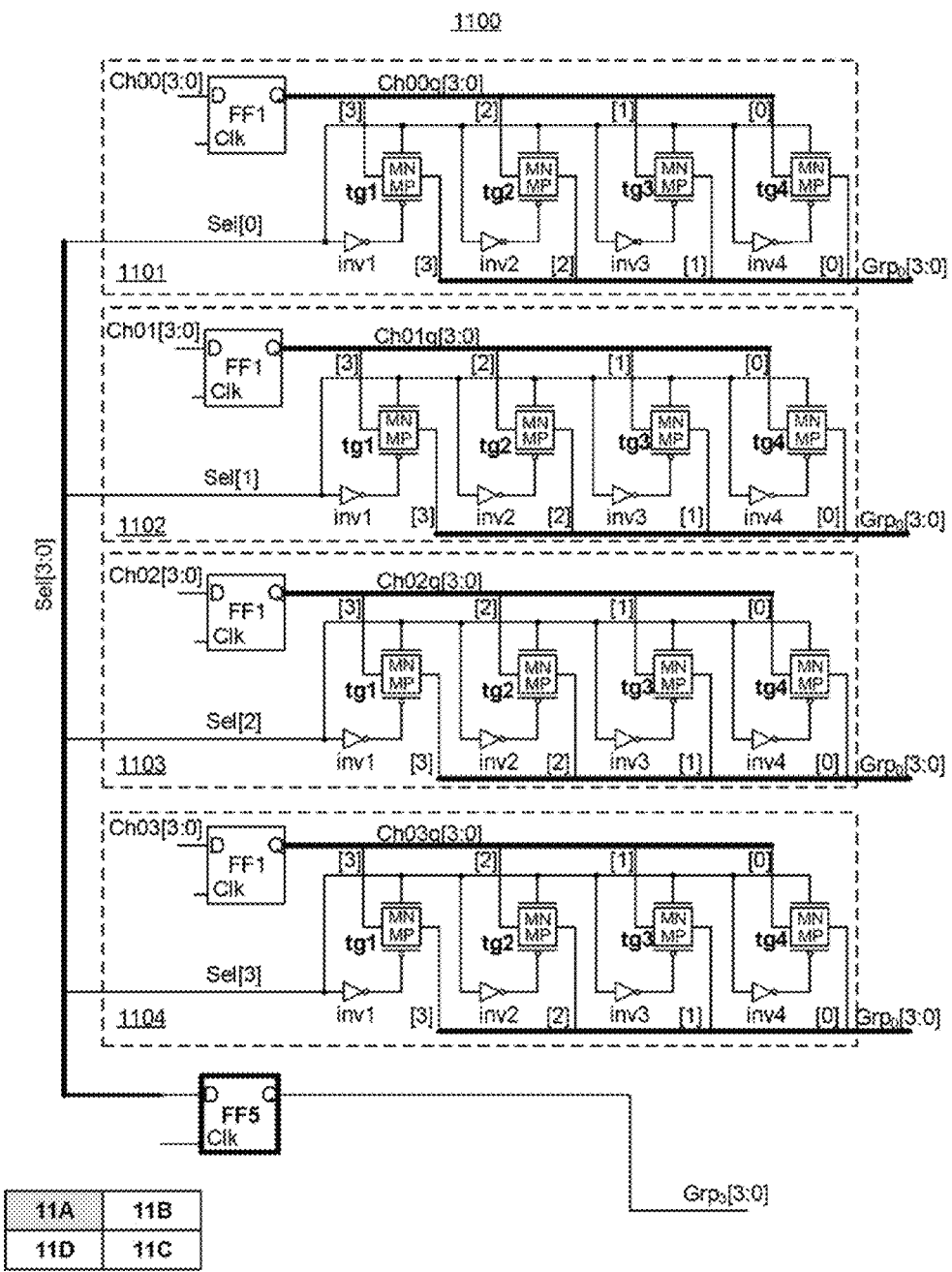
FIGS. 11A-D illustrate a four-way interleaved 4-PAM 1-hot static loop unrolled DFE, according to some embodiments of the disclosure.
Figure 11B:
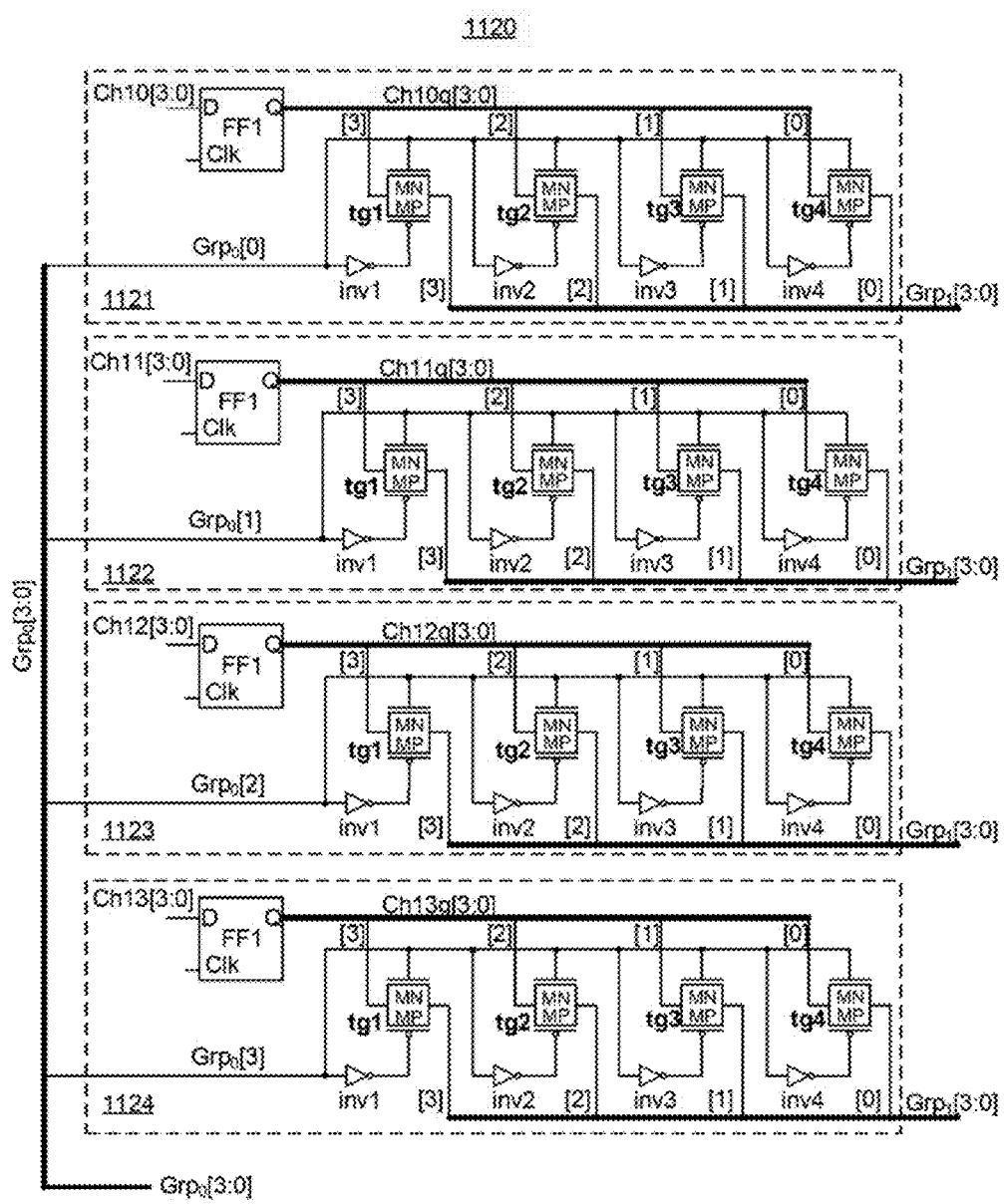
Figure 11C:
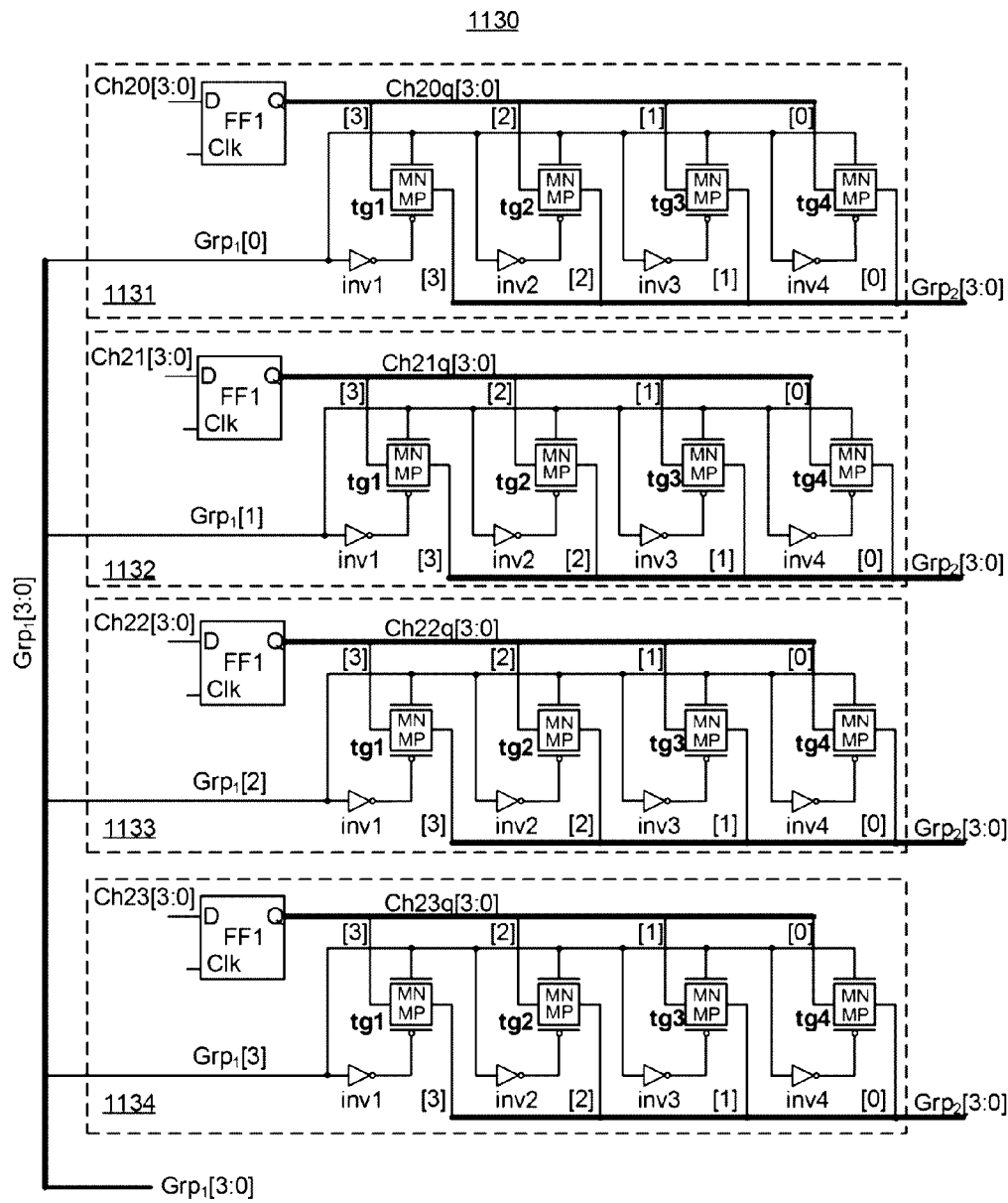
Figure 11D:
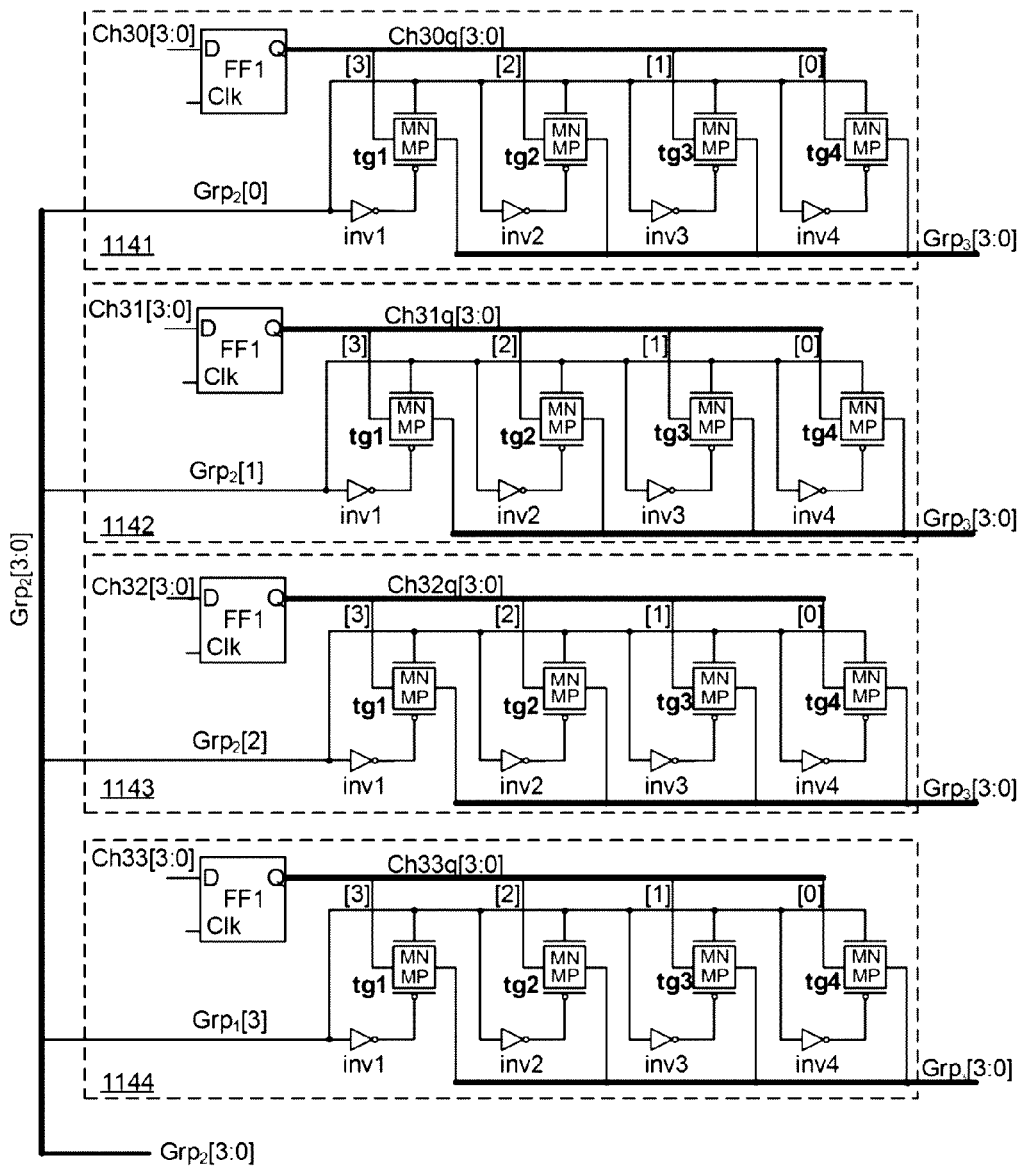
Figure 12A:
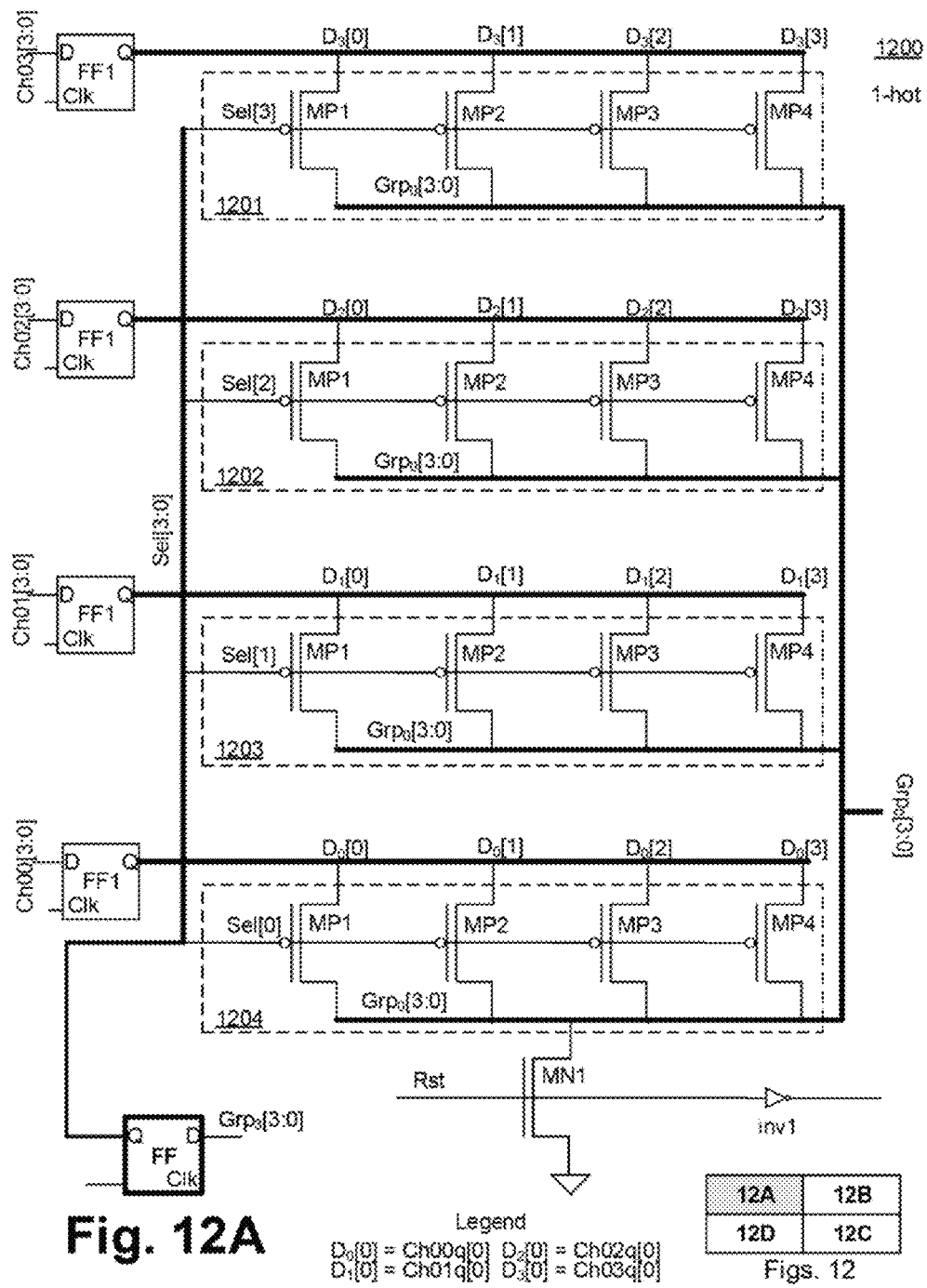
FIGS. 12A-D illustrate a four-way interleaved 4-PAM 1-hot dynamic loop unrolled DFE, according to some embodiments of the disclosure.
Figure 12B:
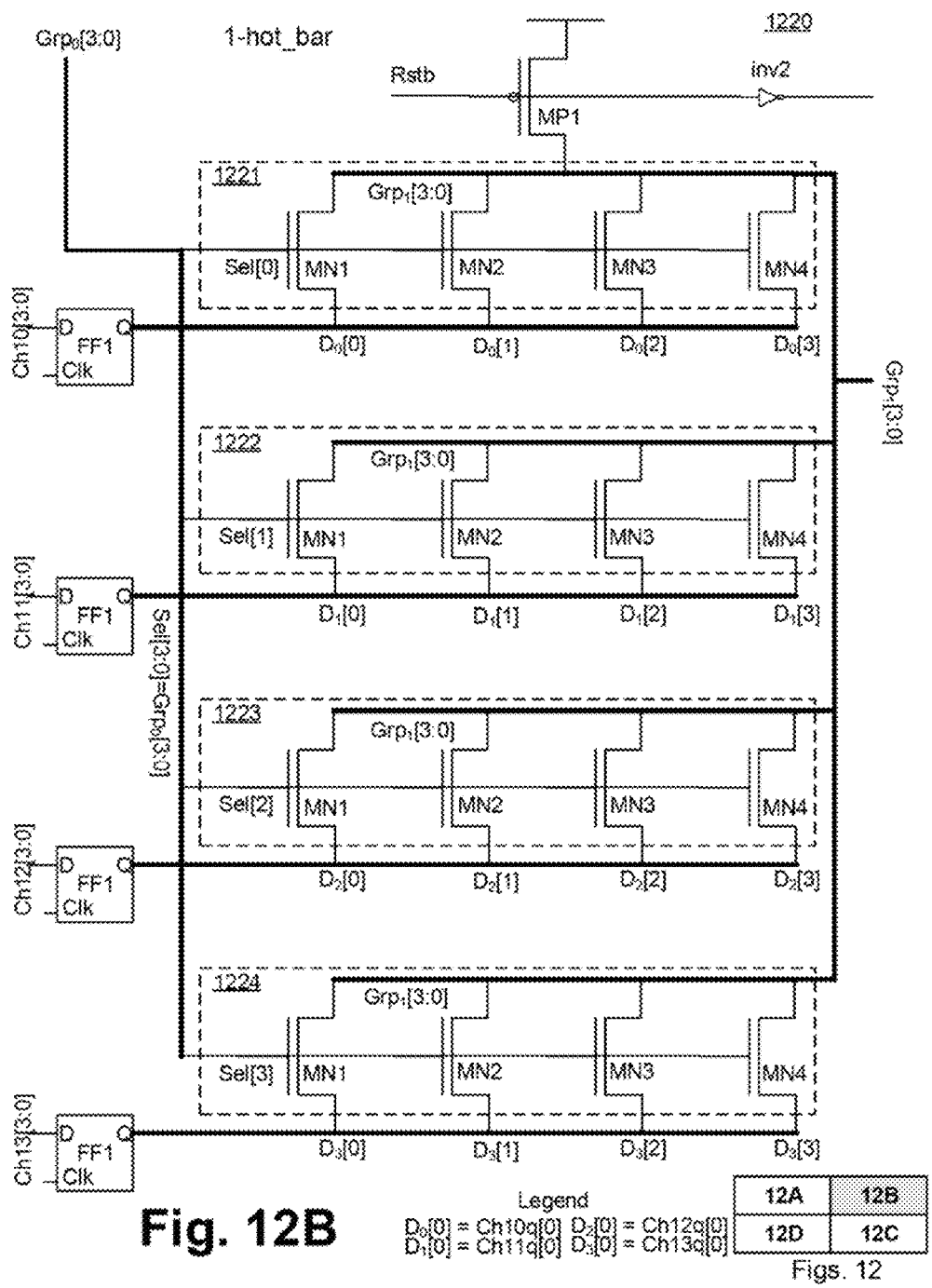
Figure 12C:
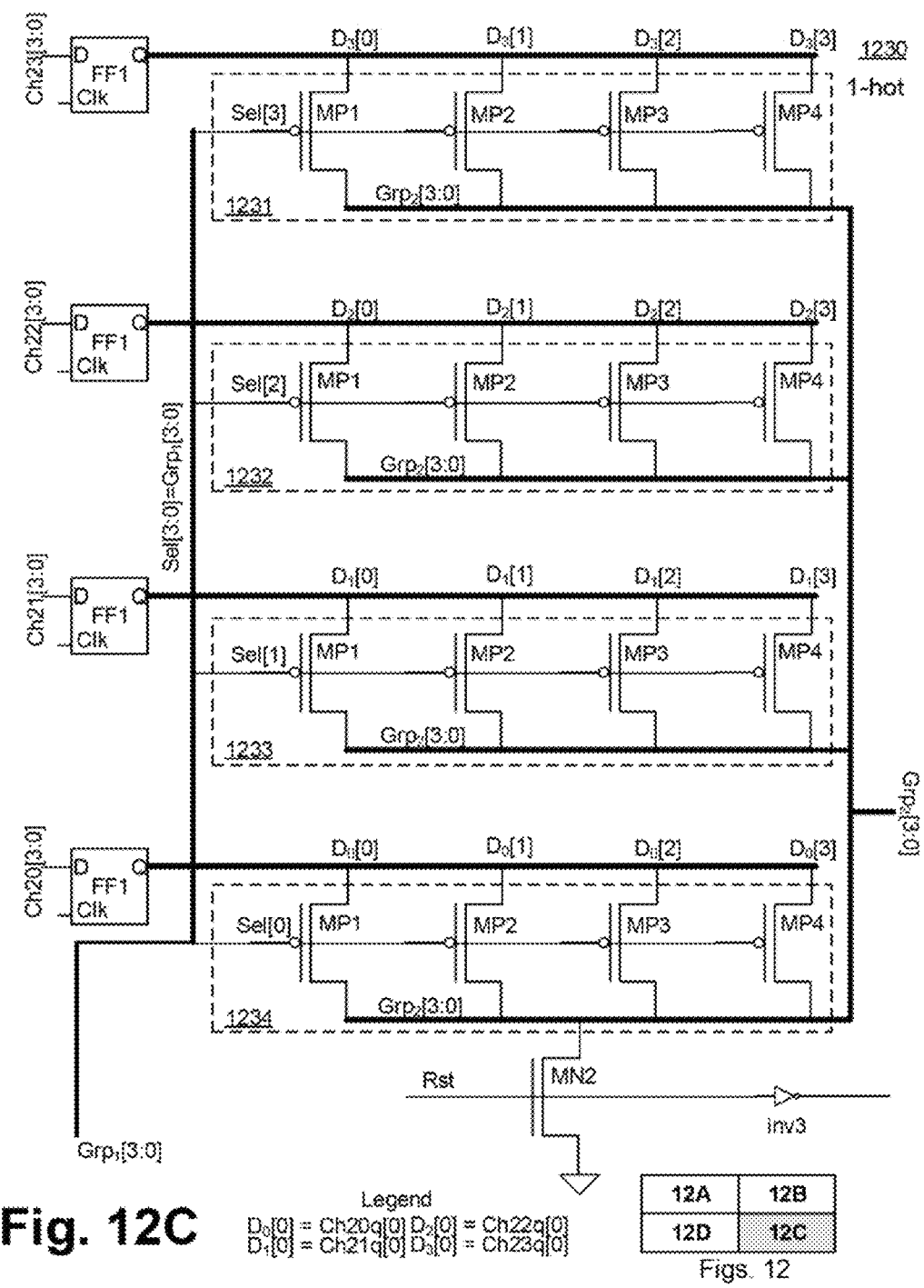
Figure 12D:
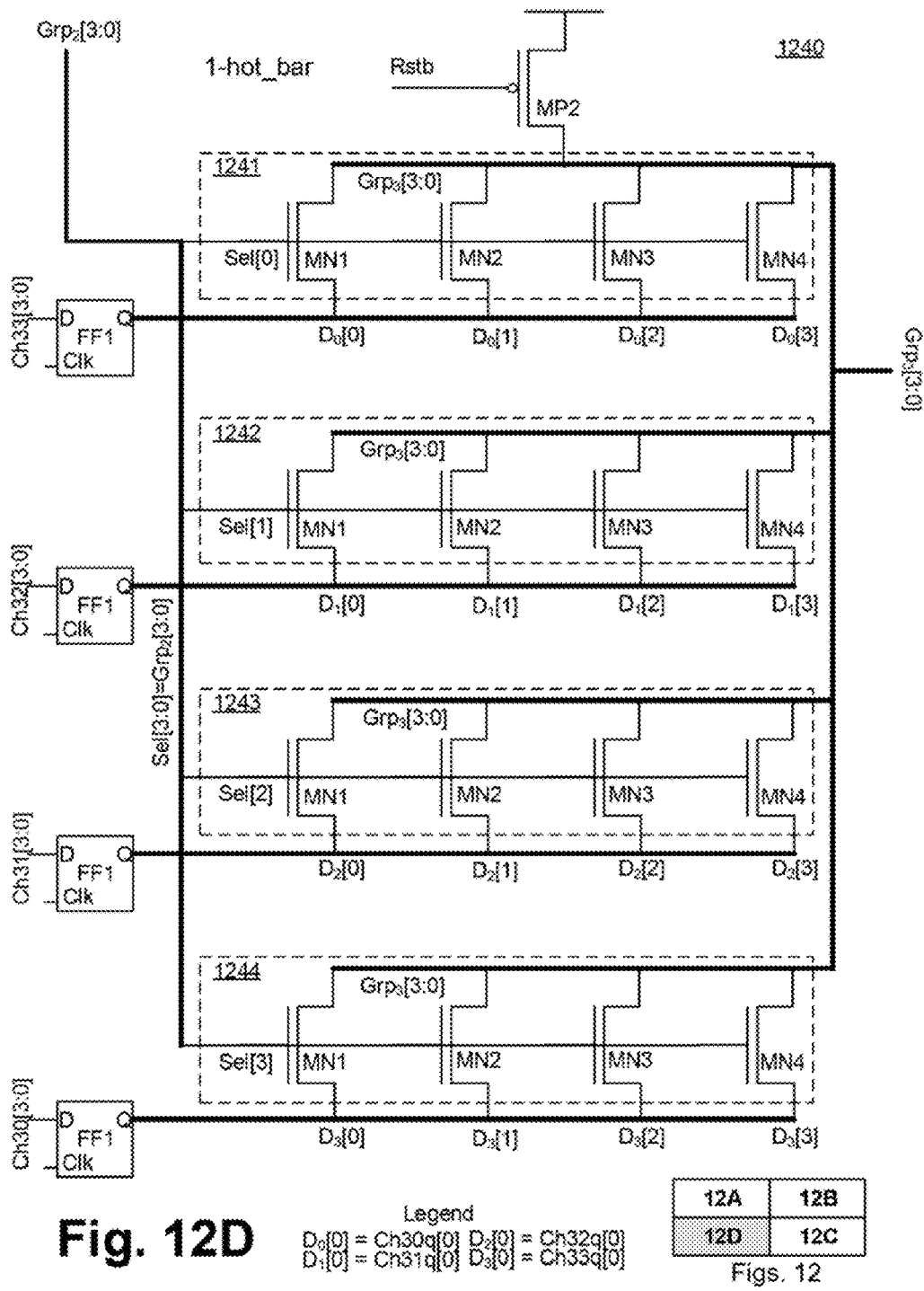

FIG. 10 illustrates one slice 1000 of a static 1-hot quarter rate DFE, according to some embodiments of the disclosure. It is pointed out that those elements of FIG. 10 having the same reference numbers (or names) as the elements of any other figure can operate or function in any manner similar to that described, but are not limited to such. So as not to obscure the various embodiments, differences between FIG. 9 and FIG. 10 are described.

In some embodiments, to save power and increase operating speed of slice 900, 1-hot input of one slice followed by an inverse of the 1-hot input of a subsequent slice is propagated through the pass-gates. For example, output n2 of the 1-hot input from Slice-2 is inverted by inverter inv1 and signal n2b is propagated through pass-gate tg2. Here, pass-gate tg2 is flipped compared to pass-gate tg2 of FIG. 9.

For example, n-type transistor MN of tg2 is coupled to n1tg instead of the p-type transistor MP of tg2 being coupled to n1tg. In some embodiments, the pass-gate tg3 is also flipped compared to pass-gate tg3 of FIG. 9. In some embodiments, to correct the polarities of the output DFE signals, output of FF6 is inverted by inverter inv5 to generate $DFE_2[0]$ and output of FF8 is inverted by inverter inv3 to generate $DFE_4[0]$. The addition of inverters inv3 and inv5 may not impact the critical timing path because inverters inv3 and inv5 are outside the critical timing path. In some embodiments, by inverting the output of Slice-2 and then flipping the pass-gates tg2 and tg3, additional delay is reduced from the critical timing path which further improves the operating speed of 1-hot speculative DFE 703 (e.g., by 30% compared to the 1-hot speculative implementation of FIG. 9).

FIGS. 11A-D illustrate a four-way interleaved 4-PAM 1-hot static loop unrolled DFE 1100, 1120, 1130, and 1140, according to some embodiments of the disclosure. It is pointed out that those elements of FIGS. 11A-D having the same reference numbers (or names) as the elements of any other figure can operate or function in any manner similar to that described, but are not limited to such. FIGS. 11A-D together illustrate a complete 4-way interleaved and de-serialized version of a 1-hot static loop DFE. The legend at the bottom of the figures shows how the four figures of FIG. 11 are assembled together to form a complete 4-way interleaved DFE.

In some embodiments, 4-way interleaved DFE 1100 comprises sections 1101, 1102, 1103, and 1104, where each section generates one bit of the zero group (i.e., $Grp_0[0]$, $Grp_0[1]$, $Grp_0[2]$, $Grp_0[3]$). In some embodiments, each section comprises four flip-flops (shown as aggregated flip-flop FF1), four pass-gates (i.e., tg1, tg2, tg3, and tg4), and four inverters (i.e., inv1, inv2, inv3, and inv4). In some embodiments, the pass-gates of each section is controlled by a select signal. For example, section 1101 is controlled by select Sel[0]; section 1102 is controlled by select Sel[1]; section 1103 is controlled by select Sel[2]; and section 1104 is controlled by select Sel[3]. In some embodiments, $Grp_3[3:0]$ which is provided by a previous set of pass-gates, is sampled by flip-flops FF5 to generate the select signals Sel[3:0].

In some embodiments, outputs of each flip-flop (e.g., FF1), which here are four flip-flops each, are 1-hot encoded signals. As such, one pass-gate from among the four pass-gates (i.e., tg1, tg2, tg3, and tg4) is active at a time and so there is no contention on the one bit output.

Here, FF1 of section 1101 samples 1-hot encoded signals Ch00[3:0] to generate sampled 1-hot encoded signals Ch00q[3:0] which are then selected by the pass-gates to generate $Grp_0[0]$. In some embodiments, FF1 of section 1102 samples 1-hot encoded signals Ch01[3:0] to generate sampled 1-hot encoded signals Ch01q[3:0] which are then selected by the pass-gates to generate $Grp_0[1]$. In some embodiments, FF1 of section 1103 samples 1-hot encoded signals Ch02[3:0] to generate sampled 1-hot encoded signals Ch02q[3:0] which are then selected by the pass-gates to generate $Grp_0[2]$. In some embodiments, FF1 of section 1104 samples 1-hot encoded signals Ch03[3:0] to generate sampled 1-hot encoded signals Ch03q[3:0] which are then selected by the pass-gates to generate $Grp_0[3]$.

In some embodiments, 4-way interleaved DFE 1120 comprises sections 1121, 1122, 1123, and 1124, where each section generates one bit of the zero group (i.e., $Grp_1[0]$, $Grp_1[1]$, $Grp_1[2]$, $Grp_1[3]$). In some embodiments, each section comprises four flip-flops (shown as aggregated flip-flop FF1), four pass-gates (i.e., tg1, tg2, tg3, and tg4), and four inverters (i.e., inv1, inv2, inv3, and inv4). In some embodiments, the pass-gates of each section is controlled by a select signal. For example, section 1121 is controlled by select signal $Grp_0[0]$; section 1122 is controlled by select signal $Grp_0[1]$; section 1123 is controlled by select signal $Grp_0[2]$; and section 1124 is controlled by select signal $Grp_0[3]$.

In some embodiments, the outputs of each flip-flop (e.g., FF1), which here are four flip-flops each, are 1-hot encoded signals. As such, one pass-gate from among the four pass-gates (i.e., tg1, tg2, tg3, and tg4) is active at a time and so there is no contention on the one bit output. Here, FF1 of section 1121 samples 1-hot encoded signals Ch10[3:0] to generate sampled 1-hot encoded signals Ch10q[3:0] which are then selected by the pass-gates to generate $Grp_1[0]$. In some embodiments, FF1 of section 1122 samples 1-hot encoded signals Ch11[3:0] to generate sampled 1-hot encoded signals Ch11q[3:0] which are then selected by the pass-gates to generate $Grp_1[1]$. In some embodiments, FF1 of section 1123 samples 1-hot encoded signals Ch12[3:0] to generate sampled 1-hot encoded signals Ch12q[3:0] which are then selected by the pass-gates to generate $Grp_1[2]$. In some embodiments, FF1 of section 1124 samples 1-hot encoded signals Ch13[3:0] to generate sampled 1-hot encoded signals Ch13q[3:0] which are then selected by the pass-gates to generate $Grp_1[3]$.

In some embodiments, 4-way interleaved DFE 1130 comprises sections 1131, 1132, 1133, and 1134, where each section generates one bit of the zero group (i.e., $Grp_2[0]$, $Grp_2[1]$, $Grp_2[2]$, $Grp_2[3]$). In some embodiments, each section comprises four flip-flops (shown as aggregated flip-flop FF1), four pass-gates (i.e., tg1, tg2, tg3, and tg4), and four inverters (i.e., inv1, inv2, inv3, and inv4). In some embodiments, the pass-gates of each section is controlled by a select signal. For example, section 1131 is controlled by select signal $Grp_1[0]$; section 1132 is controlled by select signal $Grp_1[1]$; section 1133 is controlled by select signal $Grp_1[2]$; and section 1134 is controlled by select signal $Grp_1[3]$.

In some embodiments, the outputs of each flip-flop (e.g., FF1), which here are four flip-flops each, are 1-hot encoded signals. As such, one pass-gate from among the four pass-gates (i.e., tg1, tg2, tg3, and tg4) is active at a time and so there is no contention on the one bit output. Here, FF1 of section 1131 samples 1-hot encoded signals Ch20[3:0] to generate sampled 1-hot encoded signals Ch20q[3:0] which are then selected by the pass-gates to generate $Grp_2[0]$. In some embodiments, FF1 of section 1132 samples 1-hot encoded signals Ch21[3:0] to generate sampled 1-hot encoded signals Ch21q[3:0] which are then selected by the pass-gates to generate $Grp_2[1]$. In some embodiments, FF1 of section 1133 samples 1-hot encoded signals Ch22[3:0] to generate sampled 1-hot encoded signals Ch22q[3:0] which are then selected by the pass-gates to generate $Grp_2[2]$. In some embodiments, FF1 of section 1134 samples 1-hot encoded signals Ch23[3:0] to generate sampled 1-hot encoded signals Ch23q[3:0] which are then selected by the pass-gates to generate $Grp_2[3]$.

In some embodiments, 4-way interleaved DFE 1140 comprises sections 1141, 1142, 1143, and 1144, where each section generates one bit of the zero group (i.e., $Grp_3[0]$, $Grp_3[1]$, $Grp_3[2]$, $Grp_3[3]$). In some embodiments, each section comprises four flip-flops (shown as aggregated flip-flop FF1), four pass-gates (i.e., tg1, tg2, tg3, and tg4), and four inverters (i.e., inv1, inv2, inv3, and inv4). In some embodiments, the pass-gates of each section is controlled by a select signal. For example, section 1141 is controlled by select signal $Grp_2[0]$; section 1142 is controlled by select signal $Grp_2[1]$; section 1143 is controlled by select signal $Grp_2[2]$; and section 1144 is controlled by select signal $Grp_3[3]$.

In some embodiments, the outputs of each flip-flop (e.g., FF1), which here are four flip-flops each, are 1-hot encoded signals. As such, one pass-gate from among the four pass-gates (i.e., tg1, tg2, tg3, and tg4) is active at a time and so there is no contention on the one bit output. Here, FF1 of section 1141 samples 1-hot encoded signals Ch30[3:0] to generate sampled 1-hot encoded signals Ch30q[3:0] which are then selected by the pass-gates to generate $Grp_3[0]$. In some embodiments, FF1 of section 1132 samples 1-hot encoded signals Ch31[3:0] to generate sampled 1-hot encoded signals Ch31q[3:0] which are then selected by the pass-gates to generate $Grp_3[1]$. In some embodiments, FF1 of section 1143 samples 1-hot encoded signals Ch32[3:0] to generate sampled 1-hot encoded signals Ch32q[3:0] which are then selected by the pass-gates to generate $Grp_3[2]$. In some embodiments, FF1 of section 1144 samples 1-hot encoded signals Ch33[3:0] to generate sampled 1-hot encoded signals Ch33q[3:0] which are then selected by the pass-gates to generate $Grp_3[3]$.

In some embodiments, outputs $Grp_0[0]$, $Grp_0[1]$, $Grp_0[2]$, $Grp_0[3]$ from portion 1100 are sampled by flip-flops (i.e., delayed by the first unit delay $\Delta_0$) to generate DFE data $DFE_1[0]$, $DFE_1[1]$, $DFE_1[2]$, and $DFE_1[3]$. In some embodiments, outputs $Grp_1[0]$, $Grp_1[1]$, $Grp_1[2]$, $Grp_1[3]$ from portion 1120 are sampled by flip-flops (i.e., delayed by the second unit delay $\Delta_1$) to generate DFE data $DFE_2[0]$, $DFE_2[1]$, $DFE_2[2]$, and $DFE_2[3]$. In some embodiments, outputs $Grp_2[0]$, $Grp_2[1]$, $Grp_2[2]$, $Grp_2[3]$ from portion 1130 are sampled by flip-flops (i.e., delayed by the third unit delay $\Delta_2$) to generate DFE data $DFE_3[0]$, $DFE_3[1]$, $DFE_3[2]$, and $DFE_3[3]$. In some embodiments, outputs $Grp_3[0]$, $Grp_3[1]$, $Grp_3[2]$, $Grp_3[3]$ from portion 1140 are sampled by flip-flops (i.e., delayed by the third unit delay $\Delta_3$) to generate DFE data $DFE_4[0]$, $DFE_4[1]$, $DFE_4[2]$, and $DFE_4[3]$. The DFE data is then processed by PD 501 as described with reference to FIGS. 5-6.

FIGS. 12A-D illustrate a four-way interleaved 4-PAM 1-hot dynamic loop unrolled DFE 1200, 1220, 1230, and 1240, according to some embodiments of the disclosure. It is pointed out that those elements of FIGS. 12A-D having the same reference numbers (or names) as the elements of any other figure can operate or function in any manner similar to that described, but are not limited to such. FIGS. 12A-D together illustrate a complete 4-way interleaved and de-serialized version of a 1-hot dynamic loop DFE. The legend at the bottom of the figures shows how the four figures of FIG. 12 are assembled together to form a complete 4-way interleaved dynamic loop unrolled DFE.

In some embodiments, dynamic DFE multiplexers use either n-type or p-type transistors instead of pass-gates having both n-type and p-type transistors as shown by static DFE multiplexers in FIGS. 11A-D. As such, signal path loading is reduced by 50% compared to the static implementation of FIGS. 11A-D. Referring back to FIGS. 12A-D, in some embodiments, a reset signal Rst (and its complementary Rstb) is common to each bit group or DFE portion (i.e., 1200, 1210, 1220, and 1230). In some embodiments, the reset signal alternates between n-type and p-type switches between each interleaved channel. As such, data alternates between 1-hot and 1-hot bar (i.e., complement of 1-hot) between each interleaved channel. By reducing the signal path loading and using the alternate 1-hot and 1-hot bar schemes, speculative DFE of FIGS. 12A-D operate faster (e.g., by 30%) than the speculative DFE of FIGS. 11A-D. For example, the 1-hot speculative dynamic DFE of FIGS. 12A-D cause the DFE to operate at speeds up to 91 Gb/s.

In some embodiments, 1-hot dynamic speculative DFE portion 1200 comprises sections 1201, 1202, 1203 and 1204 coupled together as shown. In some embodiments, the output of each section is coupled to n-type transistor(s) MN1 which is controllable by reset signal Rst. In some embodiments, transistor(s) MN1 when enabled (i.e., turned on) allow data to propagate through the pass-gates and eventually to the output.

In some embodiments, each section of portion 1200 comprises p-type transistors MP1, MP2, MP3, and MP4 which are controllable by a select signal. For example, the p-type transistors of section 1201 are controllable by Sel[3] signal; the p-type transistors of section 1202 are controllable by Sel[2] signal; the p-type transistors of section 1203 are controllable by Sel[1] signal; and the p-type transistors of section 1204 are controllable by Sel[0] signal.

In some embodiments, the 1-hot encoded output data (after being sampled) for each slice is provided to each section. For example, data $D_0[0]$ through $D_0[3]$ is provided to p-type transistors MP1 through MP4, respectively, in section 1204. In some embodiments, data $D_1[0]$ through $D_1[3]$ is provided to p-type transistors MP1 through MP4, respectively, in section 1203. In some embodiments, data $D_2[0]$ through $D_2[3]$ is provided to p-type transistors MP1 through MP4, respectively, in section 1202. In some embodiments, data $D_3[0]$ through $D_3[3]$ is provided to p-type transistors MP1 through MP4, respectively, in section 1204. In some embodiments, select signals Sel[3:0] is previous version of $Grp_3[3:0]$ and is generated by samplers FF.

In some embodiments, logic (not shown) is provided to pre-charge (here, pre-discharge) nodes $Grp_3[3:0]$ to logic low before Rst turns on transistor(s) MN1. In some embodiments, output $Grp_3[3:0]$ is received by DFE portion 1220. In some embodiments, reset signal Rst is inverted by inverter inv1 and provided as Rstb to DFE portion 1220.

In some embodiments, the output of each section is coupled to n-type transistor(s) MN1 which is controllable by reset signal Rst. In some embodiments, transistor(s) MN1 when enabled (i.e., turned on) allow data to propagate through the pass-gates and eventually to the output.

In some embodiments, each section of DFE portion 1220 comprises n-type transistors MN1, MN2, MN3, and MN4 which are controllable by a select signal. For example, the p-type transistors of section 1221 are controllable by Sel[0] signal; the n-type transistors of section 1222 are controllable by Sel[1] signal; the n-type transistors of section 1223 are controllable by Sel[2] signal; and the n-type transistors of section 1224 are controllable by Sel[0] signal.

In some embodiments, the 1-hot encoded output data (after being sampled) for each slice is provided to each section. For example, data $D_0[0]$ through $D_0[3]$ is provided to n-type transistors MN1 through MN4, respectively, in section 1221. In some embodiments, data $D_1[0]$ through $D_1[3]$ is provided to n-type transistors MN1 through MN4, respectively, in section 1222. In some embodiments, data $D_2[0]$ through $D_2[3]$ is provided to n-type transistors MN1 through MN4, respectively, in section 1223. In some embodiments, data $D_3[0]$ through $D_3[3]$ is provided to n-type transistors MN1 through MN4, respectively, in section 1224. In some embodiments, select signals Sel[3:0] are the same as $Grp_{0[3:0]}$.

In some embodiments, logic (not shown) is provided to pre-charge nodes $Grp_1[3:0]$ to logic high before Rstb turns on p-type transistor(s) MP1. In some embodiments, output $Grp_1[3:0]$ is received by DFE portion 1230. In some embodiments, reset bar signal Rstb is inverted by inverter inv2 and provided as Rst to subsequent DFE portion 1230.

In some embodiments, each section of portion 1230 comprises p-type transistors MP1, MP2, MP3, and MP4 which are controllable by a select signal. For example, the p-type transistors of section 1231 are controllable by Sel[3] signal; the p-type transistors of section 1232 are controllable by Sel[2] signal; the p-type transistors of section 1233 are controllable by Sel[1] signal; and the p-type transistors of section 1234 are controllable by Sel[0] signal.

In some embodiments, the 1-hot encoded output data (after being sampled) for each slice is provided to each section. For example, data $D_0[0]$ through $D_0[3]$ is provided to p-type transistors MP1 through MP4, respectively, in section 1234. In some embodiments, data $D_1[0]$ through $D_1[3]$ is provided to p-type transistors MP1 through MP4, respectively, in section 1233. In some embodiments, data $D_2[0]$ through $D_2[3]$ is provided to p-type transistors MP1 through MP4, respectively, in section 1232. In some embodiments, data $D_3[0]$ through $D_3[3]$ is provided to p-type transistors MP1 through MP4, respectively, in section 1234. In some embodiments, select signals Sel[3:0] is previous version of $Grp_1[3:0]$.

In some embodiments, logic (not shown) is provided to pre-charge (here, pre-discharge) nodes $Grp_2[3:0]$ to logic low before Rst turns on n-type transistor(s) MN2. In some embodiments, output $Grp_2[3:0]$ is received by DFE portion 1240. In some embodiments, reset signal Rst is inverted by inverter inv3 and provided as Rstb to DFE portion 1240.

In some embodiments, the output of each section is coupled to n-type transistor(s) MN2 which is controllable by reset signal Rst. In some embodiments, transistor(s) MN2 when enabled (i.e., turned on) allow data to propagate through the pass-gates and eventually to the output.

In some embodiments, each section of DFE portion 1240 comprises n-type transistors MN1, MN2, MN3, and MN4 which are controllable by a select signal. For example, the n-type transistors of section 1241 are controllable by Sel[0] signal; the n-type transistors of section 1242 are controllable by Sel[1] signal; the n-type transistors of section 1243 are controllable by Sel[2] signal; and the n-type transistors of section 1244 are controllable by Sel[0] signal.

In some embodiments, the 1-hot encoded output data (after being sampled) for each slice is provided to each section. For example, data $D_0[0]$ through $D_0[3]$ is provided to p-type transistors MN1 through MN4, respectively, in section 1241. In some embodiments, data $D_1[0]$ through $D_1[3]$ is provided to p-type transistors MN1 through MN4, respectively, in section 1242. In some embodiments, data $D_2[0]$ through $D_2[3]$ is provided to p-type transistors MN1 through MN4, respectively, in section 1243. In some embodiments, data $D_3[0]$ through $D_3[3]$ is provided to p-type transistors MN1 through MN4, respectively, in section 1244. In some embodiments, select signals Sel[3:0] are the same as $Grp_2[3:0]$.

In some embodiments, logic (not shown) is provided to pre-charge nodes $Grp_3[3:0]$ to logic high before Rstb turns off transistor(s) MP2. In some embodiments, output $Grp_3[3:0]$ is received by DFE portion 1200. In some embodiments, the sampled data Ch33q[3:0] evaluates the pre-charged $Grp_3[3:0]$ such that one of the output is evaluated to logic low (zero) while the other three signals of Grp3[3:0] do not change due to the nature of one-hot logic encoding scheme. This pre-charging of $Grp_x[3:0]$ to the appropriate logic high or logic low allows, based on sampled data encoding (one hot or one hot inverse), selective driving device (i.e., transistor MP or MN).

In some embodiments, outputs $Grp_0[0]$, $Grp_0[1]$, $Grp_0[2]$, $Grp_0[3]$ from portion 1200 are sampled by flip-flops (i.e., delayed by the first unit delay $\Delta_0$) to generate DFE data $DFE_1[0]$, $DFE_1[1]$, $DFE_1[2]$, and $DFE_1[3]$. In some embodiments, outputs $Grp_1[0]$, $Grp_1[1]$, $Grp_1[2]$, $Grp_1[3]$ from portion 1220 are sampled by flip-flops (i.e., delayed by the second unit delay $\Delta_1$) to generate DFE data $DFE_2[0]$, $DFE_2[1]$, $DFE_2[2]$, and $DFE_2[3]$. In some embodiments, outputs $Grp_2[0]$, $Grp_2[1]$, $Grp_2[2]$, $Grp_2[3]$ from portion 1230 are sampled by flip-flops (i.e., delayed by the third unit delay $\Delta_2$) to generate DFE data $DFE_3[0]$, $DFE_3[1]$, $DFE_3[2]$, and $DFE_3[3]$. In some embodiments, outputs $Grp_3[0]$, $Grp_3[1]$, $Grp_3[2]$, $Grp_3[3]$ from portion 1240 are sampled by flip-flops (i.e., delayed by the third unit delay $\Delta_3$) to generate DFE data $DFE_4[0]$, $DFE_4[1]$, $DFE_4[2]$, and $DFE_4[3]$. The DFE data is then processed by PD 501 as described with reference to FIGS. 5-6.

Figure 13:
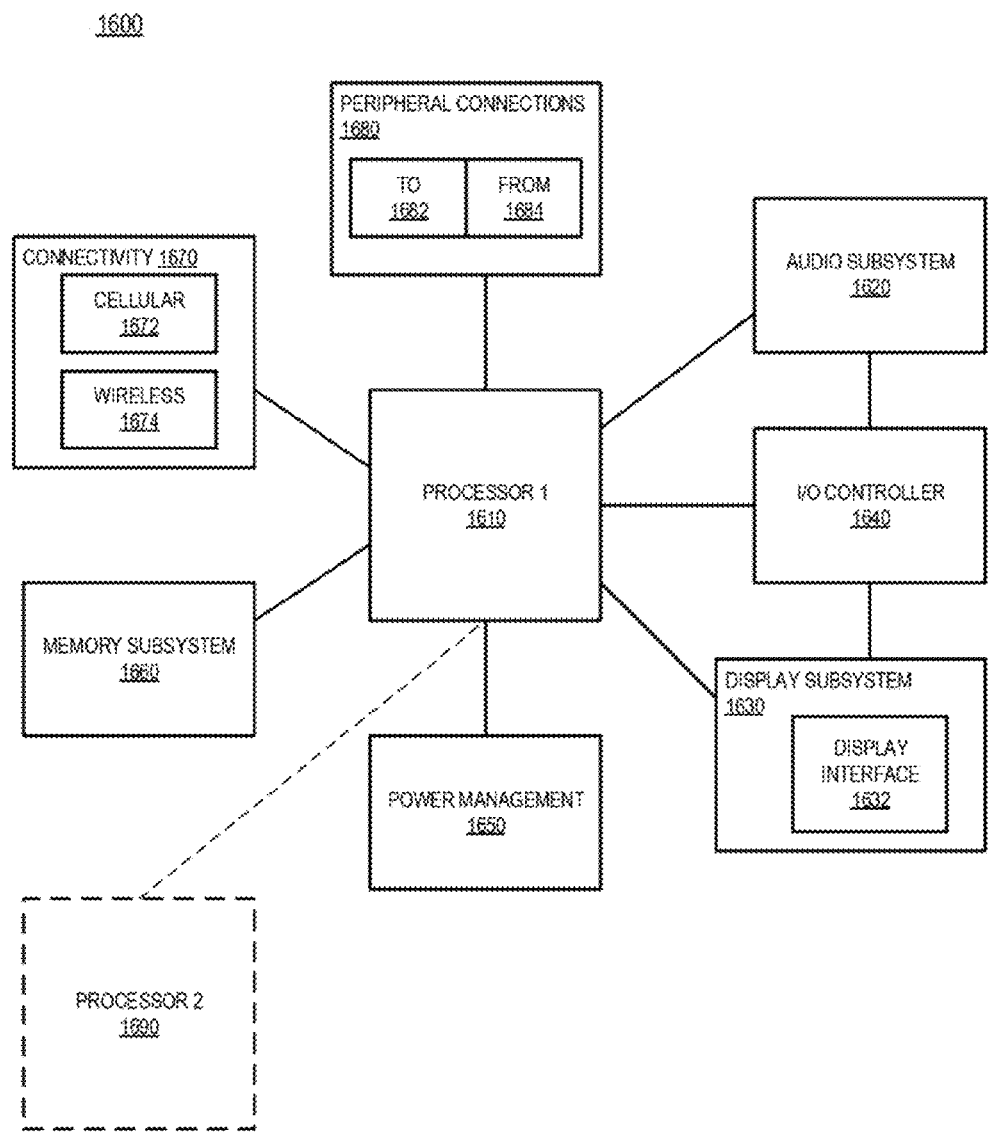
FIG. 13 illustrates a smart device or a computer system or a SoC (System-on-Chip) with 1-hot speculative DFE and/or modified CDR timing function, according to some embodiments.

FIG. 13 illustrates a smart device or a computer system or a SoC (System-on-Chip) with 1-hot speculative DFE, according to some embodiments. It is pointed out that those elements of FIG. 13 having the same reference numbers (or names) as the elements of any other figure can operate or function in any manner similar to that described, but are not limited to such.

FIG. 13 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with 1-hot speculative DFE, according to some embodiments discussed. Other blocks of the computing device 1600 may also include the 1-hot speculative DFE according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: an amplifier; a first set of samplers to sample data output from the amplifier according to a clock signal, the set of samplers to generate an output; and a converter to convert the output of the first set of samplers to 1-hot encoded data. In some embodiments, the apparatus comprises a plurality of pass-gates to receive the 1-hot encoded data or a sampled version of the 1-hot encoded data. In some embodiments, the apparatus comprises a plurality of pass-gates to receive a sampled version of the 1-hot encoded data.

In some embodiments, at least one pass-gate of the plurality is controlled by an output of another pass-gate of the plurality. In some embodiments, the apparatus comprises a second set of samplers coupled directly or indirectly to outputs of the plurality of pass-gates, the second set of samplers to generate a second output. In some embodiments, the apparatus comprises: a multiplexer to receive the second output; and a delay unit to delay output of the multiplexer.

In some embodiments, the apparatus comprises a phase detector to receive the output of the delay unit. In some embodiments, the phase detector is a multi-bit phase detector, wherein output of the phase detector indicates direction and amount of phase adjustment for a clock signal, and wherein the clock signal is provided to the first set of samplers. In some embodiments, the apparatus comprises CDR unit which includes: a loop filter coupled to the output of the phase detector; and a DCO to receive output of the loop filter and to provide the clock signal for the first set of samplers.

In some embodiments, the output of the first set of samplers is a binary output, and wherein the converter is binary to 1-hot data converter. In some embodiments, the apparatus comprises a CDR circuit to adjust phase of the clock signal such that magnitude of a first post-cursor signal associated with the sampled data is substantially half of a magnitude of a primary cursor tap associated with the sampled data. In some embodiments, the first set of samplers to perform a dual operation of sampling the data output and for generating an error signal for the CDR. In some embodiments, the apparatus comprises a Continuous Time Linear Equalizer (CTLE) coupled to an input of the amplifier. In some embodiments, a Transmit Linear Equalizer (TXLE) provides data for the amplifier.

In another example, a system is provided which comprises: a memory, a processor coupled to the memory, the processor having a receiver which includes an apparatus according to the apparatus described above; and a wireless interface for allowing the processor to communicate with another device.

In another example, an apparatus is provided which comprises: an amplifier; a first set of samplers to sample data output from the amplifier according to a clock signal, the set of samplers to generate an output; a converter to convert the output of the first set of samplers to 1-hot encoded data; a second set of samplers to sample the 1-hot encoded data to generate sampled 1-hot encoded data and its corresponding complement; and a plurality of pass-gates, at least one of the pass-gates is to receive the 1-hot encoded data and another one of the pass-gates is to receive the corresponding complement of the 1-hot encoded data.

In some embodiments, the apparatus comprises: a third set of samplers coupled directly or indirectly to outputs of the plurality of pass-gates, the third set of samplers to generate a second output; a multiplexer to receive the second output; and a delay unit to delay output of the multiplexer. In some embodiments, the apparatus comprises a CDR circuit to adjust phase of the clock signal such that magnitude of a first post-cursor signal associated with the sampled data is substantially half of a magnitude of a primary cursor tap associated with the sampled data.

In another example, a system is provided which comprises: a memory, a processor coupled to the memory, the processor having a receiver which includes an apparatus according to the apparatus described above; and a wireless interface for allowing the processor to communicate with another device.

In another example, a method is provided which comprises: sampling, by a first set of samplers, data output from an amplifier according to a clock signal, the first set of samplers to generate an output; and converting the output of the first set of samplers to 1-hot encoded data. In some embodiments, the method comprises receiving, by a plurality of pass-gates, the 1-hot encoded data or a sampled version of the 1-hot encoded data. In some embodiments, the method comprises receiving, by a plurality of pass-gates, a sampled version of the 1-hot encoded data. In some embodiments, the method comprises controlling, by at least one pass-gate of the plurality, an output of another pass-gate of the plurality.

In some embodiments, the method comprises coupling, by a second set of samplers, directly or indirectly outputs of the plurality of pass-gates, the second set of samplers to generate a second output. In some embodiments, the method comprises: receiving, by a multiplexer, the second output; and delaying, by a delay unit, output of the multiplexer.

In another example, an apparatus is provided which comprises: means for sampling data output from an amplifier according to a clock signal, the means for sampling to generate an output; and means for converting the output of the means for sampling to 1-hot encoded data. In some embodiments, the apparatus comprises means for receiving the 1-hot encoded data or a sampled version of the 1-hot encoded data.

In some embodiments, the apparatus comprises means for receiving a sampled version of the 1-hot encoded data. In some embodiments, the apparatus comprises means for controlling an output of another pass-gate of a plurality of pass-gates. In some embodiments, the apparatus comprises means for coupling directly or indirectly outputs of the plurality of pass-gates, the means for coupling to generate a second output.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   an amplifier;
   a first set of samplers to sample data output from the amplifier according to a clock signal, the first set of samplers to generate an output;
   a converter to convert the output of the first set of samplers to 1-hot encoded data; and
   a plurality of first pass-gates to receive a sampled version of the 1-hot encoded data, wherein at least one first pass-gate of the plurality is controlled by an output of another first pass-gate of the plurality.

2. The apparatus of claim 1 comprises a plurality of second pass-gates to receive the 1-hot encoded data or a sampled version of the 1-hot encoded data.

3. The apparatus of claim 1, comprises a second set of samplers coupled directly or indirectly to outputs of the plurality of first pass-gates, the second set of samplers to generate a second output.

4. The apparatus of claim 3 comprises:
   a multiplexer to receive the second output; and
   a delay unit to delay output of the multiplexer.

5. The apparatus of claim 4 comprises a phase detector to receive an output of the delay unit.

6. The apparatus of claim 5, wherein the phase detector is a multi-bit phase detector, wherein an output of the phase detector is to indicate direction and amount of phase adjustment for a clock signal, and wherein the clock signal is provided to the first set of samplers.

7. The apparatus of claim 5 comprises a Clock Data Recovery (CDR) unit which includes:
   a loop filter coupled to the output of the phase detector; and
   a digital controlled oscillator (DCO) to receive an output of the loop filter and to provide the clock signal for the first set of samplers.

8. The apparatus of claim 1, wherein the output of the first set of samplers is a binary output, and wherein the converter is binary to 1-hot data converter.

9. The apparatus of claim 1 comprises a Clock Data Recovery (CDR) circuit to adjust phase of the clock signal such that magnitude of a first post-cursor signal associated with the sampled data is substantially half of a magnitude of a primary cursor tap associated with the sampled data.

10. The apparatus of claim 9, wherein the first set of samplers is to perform a dual operation of sampling the data output and for generating an error signal for the CDR.

11. The apparatus of claim 1 comprises a Continuous Time Linear Equalizer (CTLE) coupled to an input of the amplifier.

12. The apparatus of claim 1, wherein a Transmit Linear Equalizer (TXLE) provides data for the amplifier.

13. A system comprising:
a memory;
a processor coupled to the memory, the processor having
a receiver which comprises:
an amplifier;
a first set of samplers to sample data output from the amplifier according to a clock signal, the first set of samplers to generate an output;
a converter to convert the output of the first set of samplers to 1-hot encoded data; and
a plurality of pass-gates to receive the 1-hot encoded data, wherein at least one pass-gate of the plurality is controlled by an output of another pass-gate of the plurality; and
a wireless interface for allowing the processor to communicate with another device.

14. The system of claim 13, wherein the receiver comprises:
a Continuous Time Linear Equalizer (CTLE) coupled to an input of the amplifier.

15. The system of claim 14, wherein the receiver comprises:
a second set of samplers coupled directly or indirectly to outputs of the plurality of pass-gates, the second set of samplers is to generate a second output;
a multiplexer to receive the second output; and
a delay unit to delay output of the multiplexer.

16. An apparatus comprising:
an amplifier;
a first set of samplers to sample data output from the amplifier according to a clock signal, the first set of samplers to generate an output;
a converter to convert the output of the first set of samplers to 1-hot encoded data;
a second set of samplers to sample the 1-hot encoded data to generate sampled 1-hot encoded data and its corresponding complement;
a plurality of pass-gates, wherein at least one of the pass-gates of the plurality of pass-gates is to receive the 1-hot encoded data, and wherein another one of the pass-gates of the plurality of pass-gates is to receive the corresponding complement of the 1-hot encoded data and
a third set of samplers coupled directly or indirectly to outputs of the plurality of pass-gates, the third set of samplers is to generate a second output.

17. The apparatus of claim 16 comprises:
a multiplexer to receive the second output; and
a delay unit to delay output of the multiplexer.

18. The apparatus of claim 16 comprises a Clock Data Recovery (CDR) circuit to adjust phase of the clock signal such that magnitude of a first post-cursor signal associated with the sampled data is substantially half of a magnitude of a primary cursor tap associated with the sampled data.

\* \* \* \* \*